(12) United States Patent
Ma et al.

(10) Patent No.: US 10,711,152 B2
(45) Date of Patent: Jul. 14, 2020

(54) COATING COMPOSITIONS FOR COATING SUBSTRATES INCLUDING BINDER COMPONENTS

(71) Applicant: AXALTA COATING SYSTEMS IP CO., LLC, Wilmington, DE (US)

(72) Inventors: Sheau-Hwa Ma, West Chester, PA (US); Neetu Chaturvedi, Glen Mills, PA (US); Yongqing Huang, Wilmington, DE (US)

(73) Assignee: AXALTA COATING SYSTEMS IP CO. LLC, Wilmington, DE (US)

( * ) Notice: Subject to any disclaimer, the term of this patent is extended or adjusted under 35 U.S.C. 154(b) by 99 days.

(21) Appl. No.: 15/804,557

(22) Filed: Nov. 6, 2017

(65) Prior Publication Data

US 2018/0187038 A1    Jul. 5, 2018

Related U.S. Application Data

(60) Provisional application No. 62/440,121, filed on Dec. 29, 2016.

(51) Int. Cl.

| C09D 133/12 | (2006.01) |
|---|---|
| C09D 133/08 | (2006.01) |
| C08F 220/14 | (2006.01) |
| C09D 5/33 | (2006.01) |
| C08F 220/18 | (2006.01) |
| C09D 133/14 | (2006.01) |
| C09D 133/06 | (2006.01) |
| C08K 7/00 | (2006.01) |
| C08K 3/08 | (2006.01) |

(52) U.S. Cl.
CPC .......... *C09D 133/12* (2013.01); *C08F 220/14* (2013.01); *C08F 220/18* (2013.01); *C09D 5/004* (2013.01); *C09D 133/066* (2013.01); *C09D 133/08* (2013.01); *C09D 133/14* (2013.01); *C08F 220/1804* (2020.02); *C08K 7/00* (2013.01); *C08K 2003/0812* (2013.01)

(58) Field of Classification Search
CPC ....... C09D 133/12; C09D 133/08; C09D 5/33
USPC ........................................................ 524/437
See application file for complete search history.

(56) References Cited

U.S. PATENT DOCUMENTS

| 5,483,004 | A | 1/1996 | Hoffmann et al. | |
|---|---|---|---|---|
| 6,710,128 | B1 * | 3/2004 | Helmer | C08F 2/16 524/560 |
| 2002/0169249 | A1 * | 11/2002 | Borst | C08J 3/03 524/501 |
| 2004/0122160 | A1 * | 6/2004 | Piro | C08F 265/04 524/555 |
| 2014/0377464 | A1 * | 12/2014 | Nabuurs | C08F 220/14 427/372.2 |

* cited by examiner

*Primary Examiner* — Deve V Hall
(74) *Attorney, Agent, or Firm* — Lorenz & Kopf, LLP

(57) ABSTRACT

A coating composition for coating a substrate is provided herein. The coating composition includes a first polymer including a first polymer-bound moiety having an acid-functional group, or a derivative thereof. The coating composition further includes a second polymer including a second polymer-bound moiety having an amine-functional group. The coating composition further includes a solvent. The first polymer is substantially free of amine-functional groups and the second polymer is substantially free of acid-functional groups, or derivatives thereof. The acid-functional groups and the amine-functional groups are substantially reactive to each other at least after application of the coating composition to the substrate.

21 Claims, No Drawings

COATING COMPOSITIONS FOR COATING SUBSTRATES INCLUDING BINDER COMPONENTS

CROSS-REFERENCE TO RELATED APPLICATION

This application is a U.S. Non-provisional patent application which claims priority to U.S. Provisional Application No. 62/440,121, filed Dec. 29, 2016, which is hereby incorporated in its entirety by reference.

TECHNICAL FIELD

The technical field generally relates to coating compositions for coating substrates including a first polymer and a second polymer.

BACKGROUND

Coating compositions are utilized to form coating layers such as, for example, primer layer, basecoat layer and clearcoat layer, for protective and decorative purposes. These coating compositions can be used in automotive OEM and refinish coating applications and provide a protective layer for the underlying substrate and can also have an aesthetically pleasing value. Presently, automotive coatings are typically multilayer coating systems including a clearcoat layer overlying a basecoat layer, with the basecoat layer overlying one or more additional layers such as a primer layer and an electrocoat layer.

In refinish coating applications, customers desire high productivity and excellent performance. To achieve the productivity desired, coating compositions are preferably able to dry at ambient or slightly elevated temperatures in a relatively short period of time. However, many of today's fast-drying coating compositions do not meet the desired performance requirements, such as excellent stone-chip resistance, humidity resistance, inter- and intra-layer adhesion, and appearance. Further, if the coating layer, such as a basecoat layer has not sufficiently dried prior to subsequent application of a clearcoat composition overlying the basecoat layer to form a clearcoat layer, the application of the topcoat composition will disturb the basecoat layer and the appearance of the basecoat layer will be adversely affected. For example, flake control and metallic appearance (i.e., "downflop") of basecoat compositions containing special effect pigments, such as metallic and pearlescent flake pigments, will suffer due to disturbance of the flake pigments by intermixing of the basecoat and clearcoat layers at the interface therebetween.

Accordingly, it is desirable to provide coating compositions having a short dry-time and excellent performance. Furthermore, other desirable features and characteristics will become apparent from the subsequent detailed description and the appended claims, taken in conjunction with this background.

BRIEF SUMMARY

A coating composition for coating a substrate is provided herein. The coating composition includes a first polymer including a first polymer-bound moiety having an acid-functional group, or a derivative thereof. The coating composition further includes a second polymer including a second polymer-bound moiety having an amine-functional group. The coating composition further includes a solvent. The first polymer is substantially free of amine-functional groups and the second polymer is substantially free of acid-functional groups, or derivatives thereof. The acid-functional groups and the amine-functional groups are substantially reactive to each other at least after application of the coating composition to the substrate.

DETAILED DESCRIPTION

The following detailed description is merely exemplary in nature and is not intended to limit coating compositions as described herein. Furthermore, there is no intention to be bound by any theory presented in the preceding background or the following detailed description.

A coating composition for coating a substrate is provided herein. The coating composition may be utilized to coat any type of substrate known in the art. In embodiments, the substrate is a vehicle, automobile, or automobile vehicle. "Vehicle" or "automobile" or "automobile vehicle" includes an automobile, such as, car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport. The coating composition may also be utilized to coat substrates in industrial applications such as buildings; fences; stationary structures; bridges; pipes; cellulosic materials (e.g., woods, paper, fiber, etc.).

The coating composition includes a first polymer, a second polymer, and a solvent. In embodiments, the first polymer and the second polymer are identified as being part of a binder polymer component. The term "binder polymer component" refers to film forming constituents of a coating composition. Typically, a binder polymer component can include polymers, oligomers, and a combination thereof that are essential for forming a coating having desired properties, such as hardness, protection, adhesion, and others. Additional components, such as solvents, pigments, catalysts, rheology modifiers, antioxidants, UV stabilizers and absorbers, leveling agents, antifoaming agents, anti-cratering agents, or other conventional additives may not be included in the term "binder polymer component" unless any of these additional components are film forming constituents of the coating composition. One or more of those additional components can be included in the coating composition. In certain embodiments, the "binder polymer component" does not include at least pigments and solvents. In embodiments, and as described in greater detail below, the coating composition further includes other components, such as non-functional polymers, pigments, and additives. The coating composition can further include a crosslinking agent as described herein.

The first polymer includes a first polymer-bound moiety having an acid-functional group, or a derivative thereof. Derivatives of the acid-functional group may include any acid-functional group formed from another compound in one or more steps, such as by blocking the acid functionality of the acid-functional group or by replacement of a hydrogen atom by an alkyl and acyl group. The second polymer includes a second polymer-bound moiety having an amine-functional group. The acid-functional group and the amine-functional group are substantially reactive to each other at least after application of the coating composition to the substrate. The terminology "substantially" with regard to the reactivity of the acid-functional group and the amine-functional group to each other means that at least 60, alternatively at least 75, alternatively at least 85, alternatively at least 90, alternatively at least 95, or alternatively at least 99% of the acid-functional groups and the amine-functional groups are available for reactivity to each other (i.e., degree of reactivity) on the basis of the first polymer or the second polymer having the lower molar concentration of the acid-functional groups and the amine-functional groups, respectively. The acid-functional groups and the amine-functional groups may interact through non-covalent bonding, such as ionic bonding. In embodiments, when the first and second polymers are dissolved in solvent, such as a polar solvent, ionic interactions between the acid-functional groups and the amine-functional groups are minimized thereby resulting in a coating composition that exhibits minimal gelling. Also in embodiments, after evaporation of the solvent, such as after application of the coating composition to the substrate, the ionic interactions between the acid-functional groups and the amine-functional groups are maximized thereby forming a coating layer, after curing, having improved coating performance, such as adhesion.

The first polymer is substantially free of amine-functional groups and the second polymer is substantially free of acid-functional groups. In embodiments, the amount of the amine-functional groups in the first polymer is minimized to reduce the occurrence of intramolecular interactions between the acid-functional groups of the first polymer and any residual amine-functional groups of the first polymer. Also in embodiments, the amount of the acid-functional groups in the second polymer is minimized to reduce the occurrence of intramolecular interactions between the amine-functional groups of the second polymer and any residual acid-functional groups of the second polymer. The terminology "substantially free" with regard to the presence of amine-functional groups in the first polymer means that the mixture utilized to form the first polymer includes less than 0.1 wt. %, alternatively less than 0.05 wt. %, alternatively less than 0.01 wt. %, alternatively less than 0.005 wt. %, or alternatively less than 0.001 wt. %, of amine-functional groups, based on a total weight of the mixture. The terminology "substantially free" with regard to the presence of acid-functional groups in the second polymer means that the mixture utilized to form the second polymer includes less than 0.1 wt. %, alternatively less than 0.05 wt. %, alternatively less than 0.01 wt. %, alternatively less than 0.005 wt. %, or alternatively less than 0.001 wt. %, of acid-functional groups, based on a total weight of the mixture.

The first polymer may be utilized in the coating composition in an amount of from about 1 to about 90 wt. %, alternatively from about 5 to about 90 wt. %, alternatively from about 5 to about 80 wt. %, or alternatively from about 5 to about 60 wt. %, based on a total weight of the binder polymer component of the coating composition. The second polymer may be utilized in the coating composition in an amount of from about 1 to about 90 wt. %, alternatively from about 5 to about 90 wt. %, alternatively from about 5 to about 80 wt. %, or alternatively from about 5 to about 60 wt. %, based on a total weight of the binder polymer component of the coating composition. In embodiments, the acid-functional groups of the first polymer and the amine-functional groups of the second polymer are utilized in the coating composition at a molar ratio of acid-functional groups to amine-functional groups from about 10:1 to about 1:10, alternatively from about 5:1 to about 1:5, or alternatively from about 4:1 to about 1:4.

The first polymer includes a first polymer-bound moiety having an acid-functional group, or a derivative thereof. The first polymer-bound moiety may be at least a portion of the backbone of the first polymer, may be a side-chain of the first polymer, may be grafted to the first polymer, or combinations thereof. The first polymer may include more than one first polymer-bound moiety with the polymer-bound moieties in any position of the first polymer. In certain embodiments, the first polymer-bound moiety is the first polymer. The first polymer-bound moiety may be formed from an acid-functional monomer, an acid-functional oligomer, an acid-functional macromonomer, or combinations thereof. In embodiments, the monomer, the oligomer, or the macromonomer includes a polymerizable double bond, such as an ethylenically unsaturated double bond, for example in embodiments when the first polymer is an acrylic-based polymer. However, it is to be appreciated that the first polymer may be a polyester-based polymer or polyurethane-based polymer, as described below. In embodiments, the first polymer is a copolymer. The copolymer may be a random copolymer, an alternating copolymer, a periodic copolymer, a statistical copolymer, a block copolymer, or a graft copolymer. The copolymer may be linear or branched.

The acid-functional group, or a derivative thereof, may be a carboxylic acid group, sulfonic acid group, phosphoric acid group, an acid anhydride group, or combinations thereof. The first polymer-bound moiety may have more than one type of acid-functional group, or a derivative thereof. In certain embodiments, the acid-functional group, or a derivative thereof, is a carboxylic acid group.

In embodiments, the first polymer-bound moiety is polymerized from a first polymer monomer mixture including acid-functional monomers. In certain embodiments, the acid-functional monomers are selected from the group of acrylic acid, methacrylic acid, crotonic acid, oleic acid, cinnamic acid, glutaconic acid, muconic acid, undecylenic acid, itaconic acid, crotonic acid, fumaric acid, maleic acid, and combinations thereof. In embodiments, the first polymer monomer mixture may include acid anhydrides of any of the acid-functional monomers. Suitable acid anhydrides include maleic anhydride and itaconic anhydride. In these embodiments, the acid anhydride monomers may be hydrolyzed to form the corresponding carboxyl groups. It is to be appreciated that the first polymer monomer mixture may include acid-functional monomers and acid anhydrides monomers. The acid anhydride group of the first polymer can be hydrolyzed to form an acid-functional group after polymerization of the first polymer, after the first polymer is formulated into a coating composition, or after the coating composition is applied over a substrate.

In embodiments, the first polymer monomer mixture includes the acid-functional monomers, or derivatives thereof, in an amount of from about 0.1 to about 12 wt. %, alternatively from about 0.5 to about 10 wt. %, alternatively from about 0.5 to about 8 wt. %, or alternatively from about 1 to about 5 wt. %, based on a total weight of the first polymer monomer mixture. Without being bound by theory, it is believed that a polymer polymerized from a polymer monomer mixture including acid-functional monomers in an amount of greater than 12 wt. % will result in a coating composition having moisture sensitivity and result in gelling of the coating composition due to reactivity with the second polymer. Without being bound by theory, it is also believed that a polymer polymerized from a polymer monomer mixture including acid-functional monomers in an amount of less than 0.1 wt. % will result in a polymer that insufficiently reacts with the second polymer.

The first polymer may have a weight average molecular weight in an amount of from about 2,000 to about 200,000, alternatively from about 8,000 to about 200,000, or alternatively from about 10,000 to about 200,000. "Molecular weights" disclosed herein can be determined by gel permeation chromatography (GPC) using polystyrene as the standard unless specified otherwise. The first polymer may have a polydispersity in an amount of from about 1.05 to about 10.0, alternatively from about 1.2 to about 8, or alternatively from about 1.5 to about 5. The first polymer may have a Tg of from about −50° C. to about 100° C., alternatively from about −30° C. to about 100° C., alternatively from about −5° C. to about 100° C., alternatively from about 0° C. to 80° C., or alternatively from about 10° C. to about 60° C. "Tg" means glass transition temperature of the polymer and can be measured by differential scanning calorimetry (DSC) or can be calculated as described by Fox in Bull. Amer. Physics Soc., 1, 3, page 123 (1956). It is to be appreciated that Tg for the first polymer may depend on type of polymer utilized. For example, polyester-based polymers may have a Tg of from about −50° C. to about 40° C., acrylic-based polymers may have a Tg of from about −5° C. to about 100° C., and polyurethane polymers may have a Tg of from about −50° C. to about 100° C. Without being bound by theory, it is believed that the first polymer having the weight average molecular weight described above provides a coating composition exhibiting minimal gelling and improved coating performance, such as improved adhesion. In particular, polymers having a weight average molecular weight of less than 2,000 may disassociate from the coating composition prior to reacting with the second polymer and curing thereby resulting in a coating having inferior properties. Further, even if polymers having a weight average molecular weight of less than 2,000 do not disassociate from the coating composition, the polymers may not substantially contribute to forming the coating film. In contrast, polymers having a weight average molecular weight of greater than 200,000 may result in a coating composition having a viscosity not suitable for spray application of the coating composition. The first polymer can include one or more polymers each having at least an acid-functional group, or a derivative thereof. Each of the polymers can have more than one type of acid-functional group, or a derivative thereof.

The second polymer includes a second polymer-bound moiety having an amine-functional group. The amine-functional group may be a primary amine, a secondary amine, or a tertiary amine. The second polymer-bound moiety may be at least a portion of the backbone of the second polymer, may be a side-chain of the second polymer, may be grafted to the second polymer, or combinations thereof. The second polymer may include more than one second polymer-bound moiety with the polymer-bound moieties in any position of the second polymer. In certain embodiments, the second polymer-bound moiety is the second polymer. The second polymer-bound moiety may be formed from an amine-functional monomer, an amine-functional oligomer, an amine-functional macromonomer, or combinations thereof. In embodiments, the monomer, the oligomer, or the macromonomer includes a polymerizable double bond, such as an ethylenically unsaturated double bond, for example in embodiments when the second polymer is an acrylic-based polymer. However, it is to be appreciated that the second polymer may be a polyester-based polymer or polyurethane-based polymer, as described below. In embodiments, the second polymer is a copolymer. The copolymer may be a random copolymer, an alternating copolymer, a periodic copolymer, a statistical copolymer, a block copolymer, or a graft copolymer. The copolymer may be linear or branched.

In embodiments, the second polymer-bound moiety may be polymerized from a second polymer monomer mixture including amine-functional monomers, carboxyl-functional monomers, or a combination thereof. In one embodiment, the second polymer-bound moiety may be polymerized from a second polymer monomer mixture including amine-functional monomers. The amine-functional monomers may be selected from the group of t-butylaminoethyl methacrylate (t-BAEMA), N,N-dimethylaminoethyl acrylate (DMAEA), and combinations thereof. In another embodiment, the second polymer-bound moiety is polymerized from a second polymer monomer mixture including carboxyl-functional monomers. The carboxyl-functional monomers may be methacrylic acid. In embodiments when the second polymer is polymerized from carboxyl-functional monomers, such as methacrylic acid, the second polymer is reacted with an imine compound, such as propylene imine, to form primary amine-functional groups. Secondary amine-functional groups may be polymerized from t-BAEMA. Alternatively, secondary amine-functional groups may be polymerized from a polymer including epoxy-functional groups and an amine compound, such as a primary amine. Tertiary amine-functional groups may be polymerized from N,N-dialkylaminoalkyl acrylates, such as N,N-dimethylaminoethyl acrylate and N,N-diethylaminoethyl acrylate, and N,N-dialkylaminoalkyl methacrylate, such as N,N-dimethylaminoethyl methacrylate and N,N-diethylaminoethyl methacrylate. It is to be appreciated that the amine-functional groups of the second polymer may include protective groups which cooperate with the amine-functional groups to selectively inhibit the amine functionality of the amine-functional groups, such as when the second polymer is in solution prior to application and/or prior to curing. However, it is to be appreciated that the protective groups disassociate from the amine-functional groups prior to use to permit amine functionality of the amine-functional groups, such as prior to application, after application, or after curing.

In embodiments, the second polymer monomer mixture includes the amine-functional monomers, in an amount of from about 0.1 to about 15 wt. %, alternatively from about 0.5 to about 12 wt. %, alternatively from about 0.5 to about 10 wt. %, or alternatively from about 1 to about 7 wt. %, based on a total weight of the second polymer monomer mixture. Without being bound by theory, it is believed that a polymer polymerized from a polymer monomer mixture including amine-functional monomers in an amount of greater than 15 wt. % will result in gelling of the coating composition due to reactivity with the first polymer. Without being bound by theory, it is also believed that a polymer polymerized from a polymer monomer mixture including amine-functional monomers in an amount of less than 0.1 wt. % will result in a polymer that insufficiently reacts with the first polymer.

The second polymer may have a weight average molecular weight in an amount of from about 2,000 to about 200,000, alternatively from about 8,000 to about 200,000, or alternatively from about 10,000 to about 200,000. The second polymer may have a polydispersity in an amount of from about 1.05 to about 10.0, alternatively from about 1.2 to about 8, or alternatively from about 1.5 to about 5. The second polymer may have a Tg of from about −50° C. to about 100° C., alternatively from about −30° C. to about 100° C., alternatively from about −5° C. to about 100° C., alternatively from about 0° C. to 80° C., or alternatively from about 10° C. to about 60° C. It is to be appreciated that Tg for the second polymer may depend on type of polymer utilized. For example, polyester-based polymers may have a Tg of from about −50° C. to about 40° C., acrylic-based polymers may have a Tg of from about −5° C. to about 100°

C., and polyurethane polymers may have a Tg of from about −50° C. to about 100° C. Without being bound by theory, it is believed that the second polymer having the weight average molecular weight described above provides a coating composition exhibiting minimal gelling and improved coating performance, such as improved adhesion. In particular, polymers having a weight average molecular weight of less than 2,000 may disassociate from the coating composition prior to reacting with the first polymer and curing thereby resulting in a coating having inferior properties. Examples of polymers having a weight average molecular weight of less than 2,000 and thus not suitable as the second polymer for the coating composition, include, but are not limited to, small amine-containing molecules, such as triethylamine and propyl amine. Further, even if polymers having a weight average molecular weight of less than 2,000 do not disassociate from the coating composition, the polymers may not substantially contribute to forming the coating film. In contrast, polymers having a weight average molecular weight of greater than 200,000 may result in a coating composition having a viscosity not suitable for spray application of the coating composition. The second polymer can include one or more polymers each having at least an amine-functional group. Each of the polymers can have more than one type of amine-functional group.

In embodiments, the first polymer, the second polymer, or both the first polymer and the second polymer, have a crosslinkable-functional group, such as an isocyanate-reactive group. The term "crosslinkable-functional group" refers to functional groups that are positioned in the oligomer, in the polymer, in the backbone of the polymer, in the pendant from the backbone of the polymer, terminally positioned on the backbone of the polymer, or combinations thereof, wherein these functional groups are capable of crosslinking with crosslinking-functional groups (during the curing step) to produce a coating in the form of crosslinked structures.

Typical crosslinkable-functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

In certain embodiments, the crosslinkable-functional group is a hydroxyl-functional group. The hydroxyl-functional group may be a primary hydroxyl groups, a secondary hydroxyl groups, or a combination thereof. The first polymer having the hydroxyl-functional group may be polymerized from the first polymer monomer mixture further including hydroxyl-functional monomers. The second polymer having the hydroxyl-functional group may be polymerized from the second polymer monomer mixture further including hydroxyl-functional monomers. Non-limiting examples of hydroxyl-functional monomers utilized to form primary hydroxyl groups includes 2-hydroxyethyl methacrylate (HEMA), and 2-hydroxyethyl acrylate (HEA). Non-limiting examples of hydroxyl-functional monomers utilized to form secondary hydroxyl groups includes hydroxypropyl methacrylate (HPMA) and hydroxypropyl acrylate (HPA). In certain embodiments, the hydroxyl-functional monomers are selected from the group of 2-hydroxyethyl (meth)acrylate, hydroxypropyl (meth)acrylate, and combinations thereof. It is to be appreciated that the selection of hydroxyl-functional groups for the first polymer are independent of the selection of hydroxyl-functional groups for the second polymer, and vice-versa. In other embodiments, the cross-linkable-functional group is a thiol-functional group. In various embodiments, the amine-functional group of the second polymer is the only crosslinkable-functional group of the second polymer because the amine-functional group is available for reaction with the acid-functional group of the first polymer and is reactive for crosslinking with isocyanates.

In embodiments, the first polymer, the second polymer, or both the first polymer and the second polymer are polymerized from additional monomers, such as any acrylic monomer known in the art and any ethylenically unsaturated monomer known in the art, which are in addition to the monomers including the acid-functional groups and amine-functions groups. Non-limiting examples of these additional monomers includes unsubstituted or substituted alkyl acrylates, such as those having 1-20 carbon atoms in the alkyl group; alkyl methacrylate such as those having 1-20 carbon atoms in the alkyl group; cycloaliphatic acrylates; cycloaliphatic methacrylates; aryl acrylates; aryl methacrylates; other ethylenically unsaturated monomers such as acrylonitriles, methacrylonitriles, acrylamides, methacrylamides, N-alkylacrylamides, N-alkylmethacrylamides, N,N-dialkylacrylamides, N,N-dialkylmethacrylamides; vinyl aromatics such as styrene, and combinations thereof. Other non-limiting examples include non-functional acrylic monomers, such as methyl methacrylate, ethyl methacrylate, propyl methacrylate (all isomers), butyl methacrylate (all isomers), 2-ethylhexyl methacrylate, isobornyl methacrylate, methacrylonitrile, methyl acrylate, ethyl acrylate, propyl acrylate (all isomers), butyl acrylate (all isomers), 2-ethylhexyl acrylate, isobornyl acrylate, acrylonitrile and the like. Further non-limiting examples includes other ethylenically unsaturated monomers, such as, vinyl aromatics. Non-limiting examples of vinyl aromatics includes styrene, alpha-methyl styrene, t-butyl styrene, and vinyl toluene. In certain embodiments, the first polymer, the second polymer, or both the first polymer and the second polymer are polymerized from additional monomers selected from the group of styrene, methyl (meth)acrylate, butyl (meth)acrylate, ethylhexyl (meth)acrylate, isobornyl (meth)acrylate, and combinations thereof. It is to be appreciated that the selection of additional monomers for the first polymer are independent of the selection of additional monomers for the second polymer, and vice-versa.

In an exemplary embodiment, the first polymer includes the reaction product of styrene, butyl acrylate, isobornyl acrylate, 2-hydroxyethyl methacrylate, hydroxypropyl methacrylate, and methacrylic acid. The styrene may be utilized in an amount of from about 10 to about 50 wt. %, alternatively from about 20 to about 40 wt. %, or alternatively from about 25 to about 35 wt. %, each based on a total weight of the first polymer. The butyl acrylate may be utilized in an amount of from about 10 to about 50 wt. %, alternatively from about 20 to about 40 wt. %, or alternatively from about 25 to about 35 wt. %, each based on a total weight of the first polymer. The isobornyl acrylate may be utilized in an amount of from about 1 to about 40 wt. %, alternatively from about 10 to about 30 wt. %, or alternatively from about 15 to about 25 wt. %, each based on a total weight of the first polymer. The 2-hydroxyethyl methacrylate may be utilized in an amount of from 0.1 to about 30 wt. %, alternatively from about 1 to about 20 wt. %, or alternatively from about 3 to about 12 wt. %, each based on a total weight of the first polymer. The hydroxypropyl methacrylate may be utilized in an amount of from about 0.1 to about 30 wt. %, alternatively from about 1 to about 20 wt. %, or alternatively from about 3 to about 12 wt. %, each based on a total weight of the first polymer. The methacrylic acid may be utilized in an amount of from about 0.1 to about 12 wt. %, alternatively from about 1 to about 9 wt. %, or alternatively from about 3 to about 7 wt. %, each based on a total weight of the first polymer.

In another exemplary embodiment, the first polymer includes the reaction product of methyl methacrylate, butyl methacrylate, ethylhexyl acrylate, 2-hydroxyethyl methacrylate, and methacrylic acid. The methyl methacrylate may be utilized in an amount of from about 10 to about 50 wt. %, alternatively from about 20 to about 40 wt. %, or alternatively from about 25 to about 35 wt. %, each based on a total weight of the first polymer. The butyl methacrylate may be utilized in an amount of from about 5 to about 45 wt. %, alternatively from about 15 to about 35 wt. %, or alternatively from about 20 to about 30 wt. %, each based on a total weight of the first polymer. The ethylhexyl acrylate may be utilized in an amount of from about 5 to about 45 wt. %, alternatively from about 15 to about 35 wt. %, or alternatively from about 20 to about 30 wt. %, each based on a total weight of the first polymer. The 2-hydroxyethyl methacrylate may be utilized in an amount of from about 0.1 to about 40 wt. %, alternatively from about 10 to about 30 wt. %, or alternatively from about 15 to about 25 wt. %, each based on a total weight of the first polymer. The methacrylic acid may be utilized in an amount of from about 0.1 to about 12 wt. %, alternatively from about 0.1 to about 8 wt. %, or alternatively from about 0.1 to about 4 wt. %, each based on a total weight of the first polymer.

In another exemplary embodiment, the first polymer includes the reaction product of styrene, methyl methacrylate, butyl methacrylate, ethylhexyl acrylate, 2-hydroxyethyl methacrylate, and acrylic acid. The styrene may be utilized in an amount of from about 1 to about 50 wt. %, alternatively from about 10 to about 30 wt. %, or alternatively from about 15 to about 25 wt. %, each based on a total weight of the first polymer. The methyl methacrylate may be utilized in an amount of from about 1 to about 50 wt. %, alternatively from about 10 to about 40 wt. %, or alternatively from about 20 to about 30 wt. %, each based on a total weight of the first polymer. The butyl methacrylate may be utilized in an amount of from about 1 to about 50 wt. %, alternatively from about 10 to about 30 wt. %, or alternatively from about 15 to about 25 wt. %, each based on a total weight of the first polymer. The ethylhexyl acrylate may be utilized in an amount of from about 1 to about 50 wt. %, alternatively from about 10 to about 40 wt. %, or alternatively from about 20 to about 30 wt. %, each based on a total weight of the first polymer. The 2-hydroxyethyl methacrylate may be utilized in an amount of from about 0.1 to about 40 wt. %, alternatively from about 5 to about 20 wt. %, or alternatively from about 5 to about 15 wt. %, each based on a total weight of the first polymer. The acrylic acid may be utilized in an amount of from about 0.1 to about 12 wt. %, alternatively from about 0.1 to about 8 wt. %, or alternatively from about 0.1 to about 4 wt. %, each based on a total weight of the first polymer.

In an exemplary embodiment, the second polymer includes the reaction product of methyl methacrylate, butyl acrylate, and t-butylaminoethyl methacrylate. The methyl methacrylate may be utilized in an amount of from about 60 to about 90 wt. %, alternatively from about 70 to about 85 wt. %, or alternatively from about 75 to about 81 wt. %, each based on a total weight of the second polymer. The butyl acrylate may be utilized in an amount of from about 5 to about 25 wt. %, alternatively from about 10 to about 20 wt. %, or alternatively from about 12 to about 18 wt. %, each based on a total weight of the second polymer. The t-butylaminoethyl methacrylate may be utilized in an amount of from about 0.1 to about 12 wt. %, alternatively from about 3 to about 10 wt. %, or alternatively from about 5 to about 9 wt. %, each based on a total weight of the second polymer.

In another exemplary embodiment, the second polymer includes the reaction product of methyl methacrylate, ethyl acrylate, and t-butylaminoethyl methacrylate. The methyl methacrylate may be utilized in an amount of from about 60 to about 90 wt. %, alternatively from about 70 to about 85 wt. %, or alternatively from about 75 to about 81 wt. %, each based on a total weight of the second polymer. The ethyl acrylate may be utilized in an amount of from about 5 to about 25 wt. %, alternatively from about 10 to about 20 wt. %, or alternatively from about 12 to about 18 wt. %, each based on a total weight of the second polymer. The t-butylaminoethyl methacrylate may be utilized in an amount of from about 0.1 to about 12 wt. %, alternatively from about 3 to about 10 wt. %, or alternatively from about 5 to about 9 wt. %, each based on a total weight of the second polymer.

In another exemplary embodiment, the second polymer includes the reaction product of methyl methacrylate, butyl acrylate, and N,N-dimethylaminoethyl acrylate. The methyl methacrylate may be utilized in an amount of from about 60 to about 90 wt. %, alternatively from about 70 to about 85 wt. %, or alternatively from about 75 to about 81 wt. %, each based on a total weight of the second polymer. The butyl acrylate may be utilized in an amount of from about 5 to about 25 wt. %, alternatively from about 10 to about 20 wt. %, or alternatively from about 12 to about 18 wt. %, each based on a total weight of the second polymer. The N,N-dimethylaminoethyl acrylate may be utilized in an amount of from about 0.1 to about 12 wt. %, alternatively from about 3 to about 10 wt. %, or alternatively from about 5 to about 9 wt. %, each based on a total weight of the second polymer.

In another exemplary embodiment, the second polymer includes the reaction product of methyl methacrylate, ethyl acrylate, and the reaction product of methacrylic acid and propylene imine. The methyl methacrylate may be utilized in an amount of from about 65 to about 95 wt. %, alternatively from about 73 to about 87 wt. %, or alternatively from about 77 to about 83 wt. %, each based on a total weight of the second polymer. The ethyl acrylate may be utilized in an amount of from about 5 to about 25 wt. %, alternatively from about 10 to about 20 wt. %, or alternatively from about 12 to about 18 wt. %, each based on a total weight of the second polymer. The methacrylic acid may be utilized in an amount of from about 0.1 to about 12 wt. %, alternatively from about 1 to about 7 wt. %, or alternatively from about 2 to about 6 wt. %, each based on a total weight of the second polymer. The propylene imine may be utilized in an amount of from about 0.1 to about 12 wt. %, alternatively from about 1 to about 7 wt. %, or alternatively from about 1 to about 5 wt. %, each based on a total weight of the second polymer.

In another exemplary embodiment, the second polymer includes the reaction product of methyl methacrylate, butyl acrylate, 2-hydroxyethyl acrylate, and N,N-dimethylaminoethyl acrylate. The methyl methacrylate may be utilized in an amount of from about 60 to about 90 wt. %, alternatively from about 70 to about 85 wt. %, or alternatively from about 75 to about 81 wt. %, each based on a total weight of the second polymer. The butyl acrylate may be utilized in an amount of from about 0.1 to about 15 wt. %, alternatively from about 1 to about 15 wt. %, or alternatively from about 3 to about 8 wt. %, each based on a total weight of the second polymer. The 2-hydroxyethyl acrylate may be utilized in an amount of from about 0.1 to about 25 wt. %, alternatively from about 1 to about 17 wt. %, or alternatively from about 7 to about 13 wt. %, each based on a total weight of the second polymer. The N,N-dimethylaminoethyl acrylate may be utilized in an amount of from about 0.1 to about 12 wt. %, alternatively from about 1 to about 10 wt. %, or alternatively from about 4 to about 10 wt. %, each based on a total weight of the second polymer.

The first polymer, the second polymer, or both the first polymer and the second polymer are independently selected from a linear or branched acrylic polymer, a linear or branched polyester polymer, a polyurethane polymer, or combinations thereof. "Acrylic polymer" means a polymer comprises polymerized "(meth)acrylate(s)" which mean acrylates and/or methacrylates, optionally copolymerized with other ethylenically unsaturated monomers, such as acrylamides, methacrylamides, acrylonitriles, methacrylonitriles, and vinyl aromatics, such as styrene.

In embodiments, the first polymer, the second polymer, or both the first polymer and the second polymer are polyester polymers. The polyester polymer may be linear or branched. Useful polyesters can include esterification products of aliphatic or aromatic dicarboxylic acids, polyols, diols, aromatic or aliphatic cyclic anhydrides and cyclic alcohols. It is to be appreciated that the selection of the polyester for the first polymer is independent of the selection of the polyester for the second polymer, and vice-versa.

Non-limiting examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic, and cyclobutanetetracarboxylic acid. The cycloaliphatic polycarboxylic acids can be used not only in their cis but also in their trans form and as a mixture of both forms. Further non-limiting examples of suitable polycarboxylic acids can include aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid. Combinations of polyacids, such as a combination of polycarboxylic acids and cycloaliphatic polycarboxylic acids can be suitable. Combinations of polyols can also be suitable. If desired, monoacids, such as, for example, benzoic acid may also be included to control the molecular weight. It is to be appreciated that while polyester and polyols having greater than two functionalities can be used to create more branching points, the amount of functionality due to the branching should be managed to prevent gelling.

Non-limiting suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. If desired, monohydric alcohols, such as, for example, butanol, octanol, lauryl alcohol, ethoxylated or propoxylated phenols may also be included along with polyhydric alcohols to control the molecular weight.

Non-limiting examples of suitable polyesters include a branched copolyester polymer. The branched copolyester polymer and process for production described in U.S. Pat. No. 6,861,495, which is hereby incorporated by reference, can be suitable. Monomers with multifunctional groups such as AxBy (x,y=1 to 3, independently) types including those having one carboxyl group and two hydroxyl groups, two carboxyl groups and one hydroxyl group, one carboxyl group and three hydroxyl groups, or three carboxyl groups and one hydroxyl group can be used to create branched structures. Non-limiting examples of such monomers include 2,3 dihydroxy propionic acid, 2,3 dihydroxy 2-methyl propionic acid, 2,2 dihydroxy propionic acid, 2,2-bis(hydroxymethyl) propionic acid, and the like.

The branched copolyester polymer can be conventionally polymerized from a monomer mixture containing a chain extender selected from the group of a hydroxy carboxylic acid, a lactone of a hydroxy carboxylic acid, and a combination thereof; and one or more branching monomers. Some of the suitable hydroxy carboxylic acids include glycolic acid, lactic acid, 3-hydroxypropionic acid, 3-hydroxybutyric acid, 3-hydroxyvaleric acid, and hydroxypyvalic acid. Some of the suitable lactones include caprolactone, valerolactone; and lactones of the corresponding hydroxy carboxylic acids, such as, e.g., 3-hydroxypropionic acid, 3-hydroxybutyric acid, 3-hydroxyvaleric acid, and hydroxypyvalic acid. In certain embodiments, caprolactone can is utilized. In embodiments, the branched copolyester polymer can be produced by polymerizing, in one step, the monomer mixture that includes the chain extender and hyper branching monomers, or by first polymerizing the hyper branching monomers followed by polymerizing the chain extenders. It is to be appreciated that the branched copolyester polymer can be formed from acrylic core with extending monomers described above.

In embodiments when the first polymer is a polyester polymer (also referred to herein as "acid-functional polyester"), the first polymer may be produced by using excess amounts of diacids or anhydrides with polyols or other methods known to those skilled in the art in the synthesis to ensure that the polymer chains are terminated with acid-functional groups in a linear or branched structure. Alternatively, the polyesters with hydroxy groups at the terminal positions of the polymer chain can be post-reacted with a diacid or an anhydride to form acid-functional groups.

In embodiments when the second polymer is a polyester polymer (also referred to herein as "amine-functional polyester"), the second polymer can be produced by including an amine-functional polyol such as a tertiary amine-functional polyol with polyacids and polyols in the synthesis or other methods known to those skilled in the art. Non-limiting examples of monomers having only one reactive group that is capable of condensing with acids or anhydrides and place the tertiary amine functional group at the terminal position of a polymer chain include, N, N-dimethyl ethanol amine, N, N-diethyl ethanol amine, 1-dimethyl amino-2-propanol, 3-dimethyl amino-1-propanol, 2-dimethyl amino-2-methyl-1-propanol, and the likes. Non-limiting examples of polyhydroxyl with tertiary amine groups that can place the amine functional groups along the polymer chains include simple compounds, such as N-methyl diethanol amine, N-ethyl diethanol amine, N-butyl diethanol amine, N,N-dibutyl ethanol amine, triethanol amine, triisopropanol amine, and compounds commercially available from Akzo Nobel N.V. of Amsterdam, Netherlands under the trade names Ethomeen® (one tertiary amine nitrogen atom) and Ethoduomeen® (two tertiary amine nitrogen atoms). The second polymer can also undergo post polymerization, such as by reacting carboxylic acid containing polyester polymers described above with appropriate amine compounds, such as propylene imine.

In embodiments, the first polymer, the second polymer, or both the first polymer and the second polymer are polyurethane polymers. Polyurethanes can be produced from polyols and polyisocyanates. Polyols can be polymeric or oligomeric organic species with at least two hydroxyl-functionalities or two-mercapto functionalities and their mixtures thereof. Polyesters and polycarbonates with terminal hydroxy groups can be effectively used as the diols.

In embodiments, the production of polyurethane polymers is known to the person skilled in the art; in particular, polyurethane polymers may be produced by reacting polyisocyanate(s) with polyol(s) in the excess. In certain embodiments, low molar mass polyols defined by an empirical and structural formula, such as polyhydric alcohols are utilized to form the polyurethane polymer. Non-limiting examples of polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. In other embodiments, oligomeric or polymeric polyols with number-average molar masses of, for example, up to 8000, alternatively up to 5000, alternative up to 2000, and/or, for example, corresponding hydroxyl-functional polyethers, polyesters or polycarbonates are utilized to form the polyurethane polymer.

Non-limiting examples of suitable polyisocyanates include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate. Other polyisocyanates disclosed herein can also be suitable for producing polyurethanes.

In certain embodiments, diols and diisocyantates are utilized to form the polyurethane polymer to avoid the crosslinking and formation a network which would result in polymer gelling. Chain extending agents such as diamines can be used to increase molecular weight. A small amount of monomers with higher level of functionalities such as triols or trioscyanates can be used to create branching points and branched structures. However, the concentration of these monomers with the higher level of functionalities may need to be low enough to not cause polymer crosslinking and gelling.

In embodiments when the first polymer is a polyurethane polymer (also referred to herein as "acid-functional polyurethanes"), the first polymer can be effectively produced by reacting any acid group containing diols as part of the diol mixtures at the level of acid group concentrations intended with polyisocyanates. Examples of such monomers include 2,3 dihydroxy propionic acid, 2,3 dihydroxy 2-methyl propionic acid, 2,2 dihydroxy propionic acid, and 2,2-bis(hydroxymethyl) propionic acid. Alternatively, acid-functional groups can be created at the terminal positions by using a low level of acid-containing monomers with only one functional groups that can react with polyisocyantes and terminate the polymer chains. In a staged synthesis, excess polyisocyanate is used to ensure the polymer chains are terminated with isocyanate groups first. The terminal isocyanate groups are in turn treated with acid-containing monomers having only one functional groups that can potentially react with polyisocyantes. Examples of such monomers include 2-hydroxy propionic acid, 3-hydroxy propionic acid, 3-mercapto propionic acid, and the like.

Acid-functional polyurethanes can also be produced by reacting one or more polyols and one or more polyisocyanates, where a low level of diacids or anhydrides, such as aliphatic or aromatic dicarboxylic acid anhydrides depending on the acid group concentration desired is included in the diol mixtures. Similarly, in a staged synthesis, the liner or branched polyurethanes with terminal hydroxy or thiol groups can be post-treated with diacid and/or anhydrides to generate a terminal acid-functional group.

In embodiments, when the second polymer is a polyurethane polymer (also referred to herein as "amine-functional polyurethanes"), the second polymer can have tertiary amine groups. The amine-functional polyurethane having tertiary amine groups can be produced by using low concentrations, depending on the desired molecular weight and the degree of branching, of a polymer, an oligomer, or a simple compound having one or more tertiary amine-functional groups along with one or more functional groups that are capable of reacting with isocyanate groups in the synthesis. Non-limiting examples of monomers having only one reactive group that is capable of reacting with isocyanate groups and place the tertiary amine functional group at the terminal position of a polymer chain include, N, N-dimethyl ethanol amine, N, N-diethyl ethanol amine, 1-dimethyl amino-2-propanol, 3-dimethyl amino-1-propanol, 2-dimethyl amino-2-methyl-1-propanol, and the like. Non-limiting examples of polyhydroxyl with tertiary amine groups that can place the amine-functional groups along the polymer chains include simple compounds such as N-methyl diethanol amine, N-ethyl diethanol amine, N-butyl diethanol amine, N,N-dibutyl ethanol amine, triethanol amine, triisopropanol amine, and compounds commercially available from Akzo Nobel N.V. of Amsterdam, Netherlands under the trade names Ethomeen® (one tertiary amine nitrogen atom) and Ethoduomeen® (two tertiary amine nitrogen atoms).

Amine-functional polyurethanes with primary amine groups can be produced by post reacting the acid groups of acid-functional polyurethanes, such as the acid-functional polyurethanes described above, with imine compounds, such as propylene imine. Alternatively, a polyurethane polyol can be reacted with excess of polyisocyanates to ensure that the polymer chains are terminated with isocyanate groups in a linear or branched structure. These isocyanate groups can then be hydrolyzed to form primary amine groups thereby forming amine-functional polyurethanes.

As introduced above, the coating composition further includes a solvent. In embodiments, the solvent is an organic solvent. The organic solvent may be the liquid carrier to disperse and/or dilute the above ingredients and form a coating composition having the desired properties. The solvent or solvent blends are typically selected from the group of aromatic hydrocarbons, such as, petroleum naphtha or xylenes; ketones, such as, methyl amyl ketone, methyl isobutyl ketone, methyl ethyl ketone or acetone; esters, such as butyl acetate or hexyl acetate; glycol ether esters, such as, propylene glycol monomethyl ether acetate; and alcohols, such as isopropanol and butanol, and combinations thereof. The amount of organic solvent added depends upon the desired solids level, desired rheological (e.g., spray) properties, as well as the desired amount of VOC of the coating composition. The solvent may be present in an amount of from about 10 to about 95 wt. %, alternatively from about 20 to about 95 wt. %, or alternatively from about 40 to about 95 wt. %, based on a total weight of the coating composition.

The total solids level of the coating composition may be in an amount of from about 5 to about 90 wt. %, alternatively in an amount of from about 5 to about 80 wt. % or alternatively in an amount of from about 5 to about 60 wt. %, based on a total weight of the coating composition.

In embodiments, the coating composition is a solvent borne coating composition. In certain embodiments, the coating composition is substantially free of water. The terminology "substantially free" with regard to the amount of water in the coating composition means that the coating composition includes less than 5 wt. %, alternatively less than 3 wt. %, alternatively less than 2 wt. %, alternatively less than 1 wt. %, alternatively less than 0.1 wt. %, of water, based on a total weight of the coating composition.

As also introduced above, the coating composition may further include non-functional polymers. The non-functional polymers may include linear or branched acrylic polymers, linear or branched polyester polymers, polyurethane polymers, or combinations thereof. The terminology "non-functional polymer" refers to a polymer that is substantially free from the acid-functional groups and the amine-functional groups. The terminology "substantially" as utilized herein with regard to the non-functional polymer being substantially free from the acid-functional groups and the amine functional groups means that the non-functional polymer includes less than 0.1 wt. % of the acid-functional groups and the amine-functional groups. The non-functional polymers may have other functional groups that are not the acid-functional groups or the amine-functional groups.

As also introduced above, the coating composition may further include a crosslinking agent that can react with the crosslinkable-functional group of the first polymer, the second polymer, or both the first polymer and the second polymer, to form a crosslinked polymeric network, herein referred to as a crosslinked network. While it is to be appreciated that the coating composition provides improved coating performance, especially interlayer adhesion without crosslinking with a crosslinking agent, a crosslinking agent may be utilized in the coating composition to further improve coating performance.

The term "crosslinking agent" refers to a component having "crosslinking-functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable-functional groups (during the curing step) to produce a coating in the form of crosslinked structures. One of ordinary skill in the art would recognize that certain combinations of crosslinking-functional group and crosslinkable-functional groups would be excluded, since they would fail to crosslink and produce the film forming crosslinked structures. The coating composition may include more than one type of crosslinking agent that have the same or different crosslinking-functional groups. Typical crosslinking-functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide, or combinations thereof.

In embodiments, polyisocyanates having isocyanate-functional groups may be utilized as the crosslinking agent to react with the crosslinkable-functional groups, such as hydroxyl-functional groups and amine-functional groups. In certain embodiments, only primary and secondary amine-functional groups may be reacted with the isocyanate-functional groups. Suitable polyisocyanate can have on average 2 to 10, alternately 2.5 to 8, or alternately 3 to 8, isocyanate functionalities. Typically, the coating composition has a ratio of isocyanate-functional groups on the polyisocyanate to crosslinkable-functional group (e.g., hydroxyl and/or amine groups) of the first polymer, the second polymer, or both the first polymer and the second polymer, of from about 0.25:1 to about 3:1, alternatively from about 0.8:1 to about 2:1, or alternatively from about 1:1 to about 1.8:1. In other embodiments, melamine compounds having melamine-functional groups may be utilized as the crosslinking agent to react with the crosslinkable-functional groups.

Examples of suitable polyisocyanates include any of the conventionally used aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate; uretidiones of hexamethylene diisocyanate; uretidiones of isophorone diisocyanate or isophorone diisocyanate; isocyanurate of meta-tetramethylxylylene diisocyanate; and a diol such as, ethylene glycol.

Polyisocyanate-functional adducts having isocyanaurate structural units can also be used, for example, the adduct of 2 molecules of a diisocyanate, such as, hexamethylene diisocyanate or isophorone diisocyanate, and a diol such as ethylene glycol; the adduct of 3 molecules of hexamethylene diisocyanate and 1 molecule of water (commercially available from Bayer Corporation of Pittsburgh, Pa. under the trade name Desmodur® N); the adduct of 1 molecule of trimethylol propane and 3 molecules of toluene diisocyanate (commercially available from Bayer Corporation of Pittsburgh, Pa. under the trade name Desmodur® L); the adduct of 1 molecule of trimethylol propane and 3 molecules of isophorone diisocyanate or compounds, such as 1,3,5-triisocyanato benzene and 2,4,6-triisocyanatotoluene; and the adduct of 1 molecule of pentaerythritol and 4 molecules of toluene diisocyanate.

As also introduced above, the coating composition may further include pigment. Any pigment known in the art for use in coating composition may be utilized in the coating composition. Non-limiting examples of suitable pigments include metallic oxides, metal hydroxide, effect pigments including metal flakes, chromates, such as lead chromate, sulfides, sulfates, carbonates, carbon black, silica, talc, china clay, phthalocyanine blues and greens, organo reds, organo maroons, pearlescent pigments, other organic pigments and dyes, and combinations thereof. If desired, chromate-free pigments, such as barium metaborate, zinc phosphate, aluminum triphosphate and combinations thereof, can also be utilized.

Further non-limiting examples of suitable effect pigments include bright aluminum flake, extremely fine aluminum flake, medium particle size aluminum flake, and bright medium coarse aluminum flake; mica flake coated with titanium dioxide pigment also known as pearl pigments; and combinations thereof. Non-limiting examples of suitable colored pigments include titanium dioxide, zinc oxide, iron oxide, carbon black, mono azo red toner, red iron oxide, quinacridone maroon, transparent red oxide, dioxazine carbazole violet, iron blue, indanthrone blue, chrome titanate, titanium yellow, mono azo permanent orange, ferrite yellow, mono azo benzimidazolone yellow, transparent yellow oxide, isoindoline yellow, tetrachloroisoindoline yellow, anthanthrone orange, lead chromate yellow, phthalocyanine green, quinacridone red, perylene maroon, quinacridone violet, pre-darkened chrome yellow, thio-indigo red, transparent red oxide chip, molybdate orange, molybdate orange red, and combinations thereof.

As also introduced above, the coating composition may further include additives, such as catalysts, ultraviolet light stabilizers, and other additives. The coating composition may further include a catalyst to reduce curing time and to allow curing of the coating composition at ambient temperatures. The ambient temperatures are typically referred to as temperatures in a range of from 18° C. to 35° C. Typical catalysts include organic metal salts, such as, dibutyl tin dilaurate, dibutyl tin diacetate, dibutyl tin dichloride, dibutyl tin dibromide, zinc naphthenate; compounds containing tertiary amino groups, such as, triethylamine; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or combinations thereof known to those skilled in the art.

The coating composition may further include an ultraviolet light stabilizer. Non-limiting examples of such ultraviolet light stabilizers include ultraviolet light absorbers, screeners, quenchers, and hindered amine light stabilizers. An antioxidant can also be added to the coating composition. Typical ultraviolet light stabilizers can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals of Tarrytown, N.Y., under the trade name Tinuvin®, can be utilized.

Non-limiting examples of suitable ultraviolet light absorbers include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4, 6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl) 1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Non-limiting examples of suitable hindered amine light stabilizers include N-(1,2,2,6,6-pentamethyl-4-piperidinyl)-2-dodecyl succinimide, N(lacetyl-2,2,6,6-tetramethyl-4-piperidinyl)-2-dodecyl succinimide, N-(2hydroxyethyl)-2,6,6, 6-tetramethylpiperidine-4-ol-succinic acid copolymer, 1,3,5 triazine-2,4,6-triamine, N,N'''-[1,2-ethanediybis[[[4,6-bis [butyl(1,2,2,6,6-pentamethyl-4-piperidinyl)amino]-1,3,5-triazine-2-yl]imino]-3,1-propanediyl]]bis[N, N'''-dibutyl-N', N'''-bis(1,2,2,6,6-pentamethyl-4-piperidinyl)], poly-[[6-[1, 1,3,3-tetramethylbutyl)-amino]-1,3,5-trianzine-2,4-diyl][2, 2,6,6-tetramethylpiperidinyl)-imino]-1,6-hexane-diyl[(2,2, 6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl)methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-21-oxo-7-oxa-3,20-diazal dispiro(5.1.11.2)henicosan-20-yl) propionate.

Non-limiting examples of suitable antioxidants include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6 (1H,3H,5H)-trione and benzenepropanoic acid, 3,5-bis(1,1-dimethyl-ethyl)-4-hydroxy-C7-C9 branched alkyl esters. In certain embodiments, the antioxidant includes hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168 from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals, and Doverphos® S-9228 from Dover Chemicals.

The coating compositions may further include other additives known in the art for use in coating compositions. Examples of such additives can include wetting agents, leveling and flow control agents, for example, Resiflow® S (polybutylacrylate), BYK® 320 and 325 (high molecular weight polyacrylates), BYK® 347 (polyether-modified siloxane) under respective trade names, leveling agents based on (meth)acrylic homopolymers; rheological control agents; thickeners, such as partially crosslinked polycarboxylic acid or polyurethanes; and antifoaming agents. The additives can be used in conventional amounts familiar to those skilled in the art.

Depending upon the type of crosslinking agent, the coating composition of this invention can be formulated as one-pack (1K) or two-pack (2K) coating composition. One-pack coating compositions may be air-dry coatings or un-activated coatings. The term "air-dry coating" or "un-activated coating" refers to a coating that dries primarily by solvent evaporation and does not require crosslinking to form a coating film having desired properties. If polyisocyanates with free isocyanate groups are used as the crosslinking agent, the coating composition can be formulated as a two-pack coating composition in that the crosslinking agent is mixed with other components of the coating composition only shortly before coating application. If blocked polyisocyanates are, for example, used as the crosslinking agent, the coating compositions can be formulated as a one-pack (1K) coating composition. The coating composition can be further adjusted to spray viscosity with organic solvents as determined by those skilled in the art before being applied.

"Two-pack coating composition" or "two component coating composition" means a thermoset coating composition comprising two components stored in separate containers. These containers are typically sealed to increase the shelf life of the components of the coating composition. The components are mixed prior to use to form a pot mix. The pot mix is applied as a layer of desired thickness on a substrate surface, such as an automobile body or body parts. After application, the layer is cured under ambient conditions or bake cured at elevated temperatures to form a coating on the substrate surface having desired coating properties, such as high gloss, smooth appearance, and durability.

In embodiments, the coating composition is a one-pack coating composition. As described above, the amounts of the acid-functional groups in the first polymer and the amounts of the amine-functional groups in the second polymer, along with the molecular weight of the first and second polymers, have been formulated to provide a one-pack coating composition that exhibits minimal gelling and improved coating performance, such as improved adhesion. In embodiments, the crosslinking agent may be utilized in the coating composition thereby rendering the coating composition a two-pack coating composition. However, it is to be appreciated that first polymer and the second polymer are contained in the same package and exposed to each other in the two-pack coating composition.

The coating composition may be utilized to form a coating layer on the substrate. The coating layer may be utilized as a basecoat, a clearcoat, a color coat, a top coat, a single stage coat, a mid coat, a primer, a sealer, or combinations thereof. In certain embodiments, the coating composition is utilized to form a basecoat coating layer.

The term "basecoat" refers to a coating that is opaque and provides most of protection, color, hiding (also known as "opacity") and visual appearance. A basecoat typically contains color pigments, effect pigments such as metallic flakes pigments, rheology control agent, UV absorber and other coating additives. The term "basecoat coating composition" refers to a coating composition that can be used to form a basecoat. The term "basecoat layer" refers to a coating layer form from a basecoat coating composition. A basecoat layer can be formed by applying one or more layers of the same or different basecoat coating compositions. In automotive coatings, a substrate is typically coated with a primer layer for protection and adhesion, then a basecoat layer over the primer layer, optionally a sealer on top of primer, for most of protection, color and most of visual appearance, and subsequently a clearcoat layer over the basecoat layer for further protection and visual appearance. Sometimes, a single coating layer, referred to as "top coat" can be used to provide the function of both the basecoat and the clearcoat. Additional coating layer can also be used. For example, a metal substrate can be treated with a phosphate materials and coated with an electrocoat layer before applying the primer layer.

The term "mid coat" or "mid coat layer" refers to a colored non-opaque coating positioned between a basecoat layer and a clearcoat layer in a multi-layer coating system. To achieve some unique and attractive colors or visual effects, the automobile industry and other coating end use applications can use multi-layer coating system having three or more coating layers instead of the traditional "basecoat and clearcoat" two-layer system. The multi-layer system can usually comprise at least a first colored and opaque basecoat layer, a second non-opaque color coat deposited over at least a portion of the basecoat layer, and a third clearcoat layer deposited over at least a portion of the second non-opaque color coating layer. The second non-opaque color coat is typically referred to as a mid coat layer, which contains colored pigments. The mid coat is typically formulated to be non-opaque so the color of the basecoat underneath can be visible through the mid coat.

As described above, the amounts of the acid-functional groups in the first polymer and the amounts of the amine-functional groups in the second polymer, along with the molecular weight of the first and second polymers, have been formulated to provide a coating composition that exhibits minimal gelling. Gelling can be evaluated by determining the change in viscosity of the coating composition over time. Without being bound by theory, it is believed that composition including polymers having functionalities greater than the amount of functionalities described herein for the first polymer and the second polymer will exhibit an unsuitable increase in viscosity over time, thereby rendering the composition gelled.

In embodiments, the coating layer formed from the coating composition including both the acid-functional group and the amine-functional group has an improved adhesion to the substrate as compared to a coating layer formed from a coating composition not including both the acid-functional group and the amine-functional group in accordance with ASTM D3359 B and ASTM D6677, which are described below.

In embodiments, the coating composition, after application to the substrate, including both the acid-functional group and the amine-functional group has an improved dry time as compared to a coating composition not including both the acid-functional group and the amine-functional group. The term "dry" means that the resulting finish is physically dry to the touch in a relatively short period of time to minimize dirt pick-up, and, in the case of the basecoat, to allow for the application of the subsequent clearcoat. In embodiments when the coating composition is utilized as a basecoat composition, application of a clearcoat composition onto the basecoat composition prior to allowing the basecoat composition to dry may result in decreased flake control and metallic appearance (i.e., "downflop") of the basecoat composition containing special effect pigments, such as metallic and pearlescent flake pigments, due to disturbance of the flake pigments by intermixing of the basecoat composition and clearcoat composition at the interface therebetween. "Downflop" refers to a phenomenon associate with metallic effect coatings wherein the color varies with the angle of view to provide a three-dimensional metallic effect on the surface of the vehicle.

A coating system is also provided herein. The coating system may include a primer layer overlying the substrate, a basecoat layer overlying the primer layer, and a clearcoat layer overlying the basecoat layer. It is to be appreciated that the coating system can include an additional layer or layers, such as any of the coating layers described above, with the additional layers disposed in any position between, above, or below the primer layer, the basecoat layer, and/or the clearcoat layer. In embodiments, the coating composition may be utilized to form the primer layer, the basecoat layer, the clearcoat layer, or combinations thereof. In certain embodiments, the coating composition is utilized to form the basecoat layer.

A process for coating a substrate utilizing the coating composition is also provided herein. The process includes the step of applying a first coating composition, including the coating composition described above, over at least a portion of the substrate to form a first wet coating layer. The process may further include the step of curing or drying the first wet coating layer at a temperature in a range of from 18° C. (64° F.) to 180° C. (356° F.) to form a first dry coating layer over the substrate. The first wet coating layer may be cured or dried for an amount of time from about 10 minutes to 3 days. The process may further include the step of allowing the first wet coating layer to flash. The process may further include the step applying a second coating composition to the substrate to form a multi-layer coating. In certain embodiments, the second coating composition may be applied over the first wet coating layer to form a second wet coating layer and curing the first and the second wet coating layers together to form the multi-layer coating, wherein the second coating composition is the same or different from the first coating composition. In other embodiments, the second coating composition is applied over the first dry coating layer to form a second wet coating layer and curing the second wet coating layer to form the multi-layer coating, wherein the second coating composition is the same or different from the first coating composition. In various embodiments, the first coating composition is a basecoat composition and the second coating composition is a clearcoat composition. In embodiments, the steps of applying may include spraying, electro-coating, brushing, rolling, dipping, laminating, and the like.

EXAMPLES

Examples 1-8 and 14 below describe the preparation of various first polymers (acid-functional) and various second polymers (amine-functional) of this disclosure. Examples 9-13 and 15 below describe exemplary and comparative coating compositions including the first polymers and/or the second polymers of Examples 1-8 and 14. Examples 9-13 and 15 below further describe the formation of coating layers from the coating compositions, and testing of these coating layers.

Example 1

Preparation of MMA/BA/t-BAEMA Polymer, 78/15/7% by Weight

Example 1 describes the preparation of a polymer with secondary amine groups (the second polymer) that can be utilized in an exemplary coating composition. A 5-liter flask was equipped with a thermometer, stirrer, additional funnels, heating mantel, reflux condenser and a means of maintaining a nitrogen blanket over the reactants. The flask was held under nitrogen positive pressure and the following ingredients were employed (Table 1).

TABLE 1

| | Weight (gram) |
|---|---|
| Portion 1 | |
| Ethyl acetate | 449.6 |
| Butyl acetate | 352 |
| Portion 2 | |
| Metyl methacrylate (MMA) | 1058.8 |
| Butyl acrylate (BA) | 203.6 |
| t-butylaminoethyl methacrylate (t-BAEMA) | 95 |
| Ethyl acetate | 25.4 |
| Toluene | 16.9 |
| Portion 3 | |
| Toluene | 21.9 |
| Portion 4 | |
| 2,2'-Azobis(methylbutyronitrile) (Vazo ® 67 by DuPont Co., Wilmington, DE) | 10.8 |
| Ethyl acetate | 84.9 |
| Toluene | 389.4 |

TABLE 1-continued

| | Weight (gram) |
|---|---|
| Portion 5 | |
| Toluene | 13 |
| Portion 6 | |
| Isopropanol | 254.5 |
| Acetone | 424.2 |
| Total | 3400 |

Portion 1 mixture was charged to the flask. The mixture was heated to reflux temperature and refluxed for about 10 minutes. Portion 2 was fed to the flask over 180 minutes. The Portion 4 was simultaneously fed to the flask over 360 minutes. The Portion 3 was used to rinse the Portion 2 into the flask at the end of the feed. The reaction mixture was held at reflux temperature throughout the course of feeds and the reaction mixture was refluxed for another 30 minutes. The Portion 5 was used to rinse the Portion 4 at the end of the feed. The reaction mixture was held at reflux temperature throughout the course of feeds and the reaction mixture was refluxed for another 120 minutes. The resin solution was cooled to about 50° C. before Portion 6 was added. The finished product was filled out.

The resulting polymer solution was a light yellow clear polymer solution and had a solid content of about 40.1% and a Gardner-Holtz viscosity of U+½.

Example 2

Preparation of MMA/EA/t-BAEMA Polymer, 78/15/7% by Weight

Example 2 describes the preparation of another polymer with secondary amine groups (the second polymer) that can be utilized in an exemplary coating composition. The resin solution was prepared using the procedure described in Example 1 except that the BA monomer was replaced with EA (Ethyl acrylate) monomer.

The resulting polymer solution was a light yellow clear polymer solution and had a solid content of about 39.5% and a Gardner-Holtz viscosity of X+½.

Example 3

Preparation of MMA/BA/DMAEA Polymer, 78/15/7% by Weight

Example 3 describes the preparation of a polymer with tertiary amine groups (the second polymer) that can be utilized in an exemplary coating composition. The resin solution was prepared using the procedure described in Example 1 except that the t-BAEMA monomer was replaced with DMAEA (N,N-dimethylaminoethyl acrylate monomer).

The resulting polymer solution was a light yellow clear polymer solution and had a solid content of about 39.4% and a Gardner-Holtz viscosity of U+¼. The polymer had a 77,620 Mw and a 42,379 Mn based on gel permeation chromatography using polymethylmethacrylate as standard.

Example 4

Preparation of MMA/EA/MAA(PI) Polymer, 81/14.6/4.4/2.91% by Weight

Example 4 describes the preparation of a polymer with primary amine groups (the second polymer) that can be utilized in an exemplary coating composition. The MMA/EA/MAA (81/14.6/4.4% by weight) resin solution was prepared using the procedure similar as described in Example 1 except that the t-BAEMA monomer was replaced with MAA (methacrylic acid monomer) in a solvent blend of isopropanol, ethyl acetate, and toluene. After cooling the polymer solution to about 55° C., stoichiometric amount of propylene imine was added into the reaction mixture to react with the carboxylic acid groups. The reaction mixture was gradually heated to 70° C. and the temperature was held there for one hour to ensure the reaction was complete before cooling.

The resulting polymer solution was a light yellow clear polymer solution and had a solid content of about 40.1% and a Gardner-Holtz viscosity of Z+¼. The polymer had a 104,104 Mw and a 37,348 Mn based on gel permeation chromatography using polymethylmethacrylate as standard.

Example 5

Preparation of MMA/BA/HEA/DMAEA Polymer, 78/5/10/7% by Weight

Example 5 describes the preparation of a polymer with tertiary amine groups and hydroxyl groups (the second polymer) that can be utilized in an exemplary coating composition. The resin solution was prepared using the procedure described in Example 1 except that the t-BAEMA monomer was replaced with DMAEA (N,N-dimethylaminoethyl acrylate monomer) and 2-hydroxyethyl acrylate (HEA) was added to the monomer blend. Methyl isobutyl ketone was used as the solvent.

The resulting polymer solution was a light yellow clear polymer solution and had a solid content of about 43% and a Gardner-Holtz viscosity of Z1. The polymer had a 103,791 Mw and a 28,582 Mn based on gel permeation chromatography using polymethylmethacrylate as standard.

Example 6

Preparation of Sty/BA/IBOA/HEMA/HPMA/MAA Polymer, 29/31/20/7.5/7.5/5% by Weight

Example 6 describes the preparation of a polymer with carboxylic acid groups (the first polymer) that can be utilized in an exemplary coating composition. A 5-liter flask was equipped with a thermometer, stirrer, additional funnels, heating mantel, reflux condenser and a means of maintaining a nitrogen blanket over the reactants. The flask was held under nitrogen positive pressure and the following ingredients were employed (Table 2).

TABLE 2

|  | Weight (gram) |
|---|---|
| Portion 1 | |
| Methyl amyl ketone | 560.04 |
| Portion 2 | |
| Styrene (Sty) | 592.34 |
| Butyl acrylate (BA) | 633.16 |
| Isobornyl acrylate (IBOA) | 408.56 |
| 2-Hydroxyethyl methacrylate (HEMA) | 153.15 |
| Hydroxypropyl methacrylate (HPMA) | 153.15 |
| Methacrylic acid (MAA) | 102.14 |
| Portion 3 | |
| Methyl amyl ketone | 33.21 |
| Portion 4 | |
| Di-t-butyl peroxide | 11.22 |
| Methyl amyl ketone | 331.88 |
| Portion 5 | |
| Methyl amyl ketone | 24.87 |
| Portion 6 | |
| Methyl amyl ketone | 240.28 |
| Total | 3244 |

Portion 1 mixture was charged to the flask. The mixture was heated to reflux temperature and refluxed for about 10 minutes. Portion 2 was fed to the flask over 195 minutes. The Portion 4 was simultaneously fed to the flask over 200 minutes. The Portion 3 was used to rinse the Portion 2 into the flask at the end of the feed. The reaction mixture was held at reflux temperature throughout the course of feeds. The Portion 5 was used to rinse the Portion 4 at the end of the feed. The reaction mixture was held at reflux temperature throughout the course of feeds and the reaction mixture was refluxed for another 120 minutes. The resin solution was cooled to about 50° C. before Portion 6 was added. The finished product was filled out.

The resulting polymer solution was a light yellow clear polymer solution and had a solid content of about 40.1% and a Gardner-Holtz viscosity of U+½. The polymer had a 28,875 Mw and a 5,714 Mn based on gel permeation chromatography using either polymethylmethacrylate or polystyrene as standard.

Example 7

Preparation of MMA/BMA/EHA/HEMA/MAA (30.29/26.65/23.11/18.55/1.40% by Weight)

Example 7 describes the preparation of another polymer with carboxylic acid groups (the first polymer) that can be utilized in an exemplary coating composition. The resin solution was prepared using the procedure similar as described in Example 6 with the monomers and their weight ratios as listed above in a solvent blend of xylene, butyl acetate, and n-butanol.

The resulting polymer solution was a light yellow clear polymer solution and had a solid content of about 54.34% and a Gardner-Holtz viscosity of X+½. The polymer had a 31,982 Mw and a 10,530 Mn based on gel permeation chromatography using either polymethylmethacrylate or polystyrene as standard.

Example 8

Preparation of
Stv/MMA/BMA/EHA/HEMA/Acrylic Acid (AA)
Polymer, 20/24/20/23.3/10.5/2.2% by Weight Example 8 describes the preparation of another polymer with carboxylic acid groups (the first polymer) that can be utilized in an exemplary coating composition. The resin solution was prepared using the procedure similar as described in Example 6 with the monomers and their weight ratios as listed above in a butyl acetate.

The resulting polymer solution was a clear polymer solution and had a solid content of about 58.35% and a Gardner-Holtz viscosity of Z+½. The polymer had a 38,026 Mw and a 9,537 Mn based on gel permeation chromatography using either polymethylmethacrylate or polystyrene as standard.

Example 9

Example 9 describes the coating properties that can be achieved by utilizing both the first polymers (acid-functional) and the second polymers (amine-functional) in exemplary coating compositions. Example 9 particularly focuses on the second polymers having primary amine-functional groups. The results show the improvement in adhesion performance of coating layers formed from the exemplary coating compositions as compared coating layers formed from comparative coating compositions. The improvement on adhesion performance is demonstrated in 3 colors: Silver, Bright Red and Metallic red.

Example 9.1: Silver Coating Compositions with Aluminum Flakes

Sample Coating Compositions are Generally Described as Follows:

C1 is a comparative coating composition including the polymer having a primary amine-functional group of Example 4 (the second polymer); C5 is another comparative coating composition including the polymer having an acid-functional group of Example 6 (the first polymer); E1 is an exemplary coating composition including both the polymer of Example 4 (the second polymer) and the polymer of Example 6 (the first polymer); and E2 is another exemplary coating composition including both the polymer of Example 4 (the second polymer) and the polymer having an acid-functional group of Example 7 (the first polymer).

Preparation of the Coating Compositions:

In Table 3 below, the ingredients from Portion 1 and Portion 2 below were added to a metal container and mixed well using an air mixer. Portion 3 was added to the container and mixed for another 30 minutes. Portion 4 and Portion 5 were then added in sequence to the container and mixed for another 15 minutes.

TABLE 3

| | Example 9.1—Silver Coating Compositions | | | |
|---|---|---|---|---|
| | C5 | C1 | E1 | E2 |
| Portion 1 | | | | |
| Acrylic Polyol Resin | 17.54 | 17.76 | 6.86 | |
| Example 4 Resin | | 10.05 | 10.08 | 9.61 |
| Example 6 Resin | 6.30 | | 10.93 | |
| Example 7 Resin | | | | 21.46 |
| Portion 2 | | | | |
| Wax Dispersion | 33.17 | 33.57 | 33.69 | 34.26 |
| Anti-Settling Dispersion | 3.97 | 3.97 | 3.97 | 1.59 |
| Portion 3 | | | | |
| Aluminum Paste | 7.25 | 7.25 | 7.25 | 7.25 |
| Portion 4 | | | | |
| CAB-20 Solution | 8.27 | 8.37 | 8.40 | 8.55 |
| CAB-1 Solution | 8.53 | 8.63 | 8.67 | 8.81 |
| Portion 5 | | | | |
| PGMEA | 2.52 | 2.52 | 2.52 | 2.52 |
| Butyl Acetate | 12.46 | 7.90 | 7.64 | 6.00 |

In Table 3, Anti-Settling Dispersion is a Bentone Dispersion; Aluminum Paste is aluminum paste in a mixture of aliphatic and aromatic solvents; CAB-20 Solution is 15% by weight of Cellulose Acetate Butyrate ("CAB") which is CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; and PGMEA is Propylene Glycol Monomethyl Ether Acetate.

Example 9.2: Bright Red Coating Compositions

Sample Coating Compositions are Generally Described as Follows:

C6 is a comparative coating composition including the polymer having a primary amine-functional group of Example 4 (the second polymer); E9 is an exemplary coating composition including both the polymer of Example 4 (the second polymer) and the polymer of Example 6 (the first polymer); and E10 is another exemplary coating composition including both the polymer of Example 4 (the second polymer) and the polymer having an acid-functional group of Example 7 (the first polymer).

Preparation of the Coating Compositions:

Coating compositions were prepared using the same procedure described above with the ingredients listed in Table 4 below.

TABLE 4

| | Example 9.2—Bright Red Coating Compositions | | |
|---|---|---|---|
| | C6 | E9 | E10 |
| Portion 1 | | | |
| Acrylic Polyol Resin | 11.11 | | |
| Example 4 Resin | 10.22 | 10.24 | 7.57 |
| Example 6 Resin | | 11.09 | |
| Example 7 Resin | | | 14.78 |
| Portion 2 | | | |
| Wax Dispersion | 27.59 | 27.64 | 27.71 |
| Portion 3 | | | |
| First Red Dispersion | 17.46 | 17.46 | 17.46 |
| Portion 4 | | | |
| CAB-20 Solution | 6.88 | 6.89 | 6.91 |
| CAB-1 Solution | 7.10 | 7.11 | 7.13 |

TABLE 4-continued

| | Example 9.2—Bright Red Coating Compositions | | |
|---|---|---|---|
| | C6 | E9 | E10 |
| Portion 5 | | | |
| PGMEA | 2.5 | 2.5 | 2.5 |
| Butyl Acetate | 17.14 | 17.07 | 15.97 |

In Table 4, First Red Dispersion is Commercial Power Tint: PT-165 (manufactured by Axalta Coating Systems, Philadelphia, Pa.); CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; and PGMEA is Propylene Glycol Monomethyl Ether Acetate.

Example 9.3: Metallic Red Coating Composition with Aluminum Flakes

Sample Coating Compositions are Generally Described as Follows:

C9 is a comparative coating composition including the polymer having a primary amine-functional group of Example 4 (the second polymer); E15 is an exemplary coating composition including both the polymer of Example 4 (the second polymer) and the polymer of Example 6 (the first polymer); and E16 is another exemplary coating composition including both the polymer of Example 4 (the second polymer) and the polymer having an acid-functional group of Example 7 (the first polymer).

Preparation of the Coating Compositions:

Coating compositions were prepared using the same procedure described above with the ingredients listed in Table 5 below.

TABLE 5

| | Example 9.3—Metallic Red Coating Compositions | | |
|---|---|---|---|
| | C9 | E15 | E16 |
| Portion 1 | | | |
| Acrylic Polyol Resin | 15.46 | 4.60 | |
| Example 4 Resin | 10 | 10 | 8.78 |
| Example 6 Resin | | 10.84 | |
| Example 7 Resin | | | 18.77 |
| Portion 2 | | | |
| Wax Dispersion | 33.37 | 33.4 | 33.67 |
| Anti-Settling Dispersion | 1.59 | 1.59 | 1.59 |
| Portion 3 | | | |
| Aluminum Paste | 6.52 | 6.52 | 6.52 |
| Second Red Dispersion | 4.73 | 4.73 | 4.73 |
| Portion 4 | | | |
| CAB-20 Solution | 8.32 | 8.33 | 8.4 |
| CAB-1 Solution | 8.58 | 8.59 | 8.66 |
| Portion 5 | | | |
| PGMEA | 2.50 | 2.50 | 2.50 |
| Butyl Acetate | 8.95 | 8.9 | 6.39 |

In Table 5, Anti-Settling Dispersion is a Bentone Dispersion; Aluminum Paste is aluminum paste in a mixture of aliphatic and aromatic solvents; Second Red Dispersion is Chromabase® 866J (manufactured by Axalta Coating Systems, Philadelphia Pa.); CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; and PGMEA is Propylene Glycol Monomethyl Ether Acetate.

Example 9: Formation of Coating Layers from Coating Compositions

Commercial primer-sealer 42440S™ (manufactured by Axalta Coating Systems, Philadelphia, Pa.) was sprayed on electro-coated metal panels. Basecoat samples (coating compositions) were mixed in a 1:1 ratio by volume with a commercial reducer 7175S™ (manufactured by Axalta Coating Systems, Philadelphia, Pa.). The reduced basecoat samples were sprayed on top of the dried sealer following the technical data sheet. Commercial clearcoat 74500S™ (manufactured by Axalta Coating Systems, Philadelphia, Pa.) was then sprayed and the panels were baked in an oven at 160° F. for 15 minutes. The panels were allowed to cure under ambient condition for 3 days to form the coating layers.

Example 9: Adhesion Testing of Coating Layers

Adhesion testing was performed on each of the coating layers of Example 9. In particular, dry and wet adhesion testing was performed utilizing Cross-Hatch Adhesion Testing and X-Hatch Adhesion Testing. Dry adhesion test was performed on the panels on Day 3, Day 5 and Day 7 after the panels were baked. The panels were then kept in the humidity cabinet for 96 hours. Wet adhesion test was performed on the panels immediately and 4 hours after taking the panels out of the humidity cabinet. 24 hours recovery test is performed on the panels 24 hours after taking the panels out of the humidity cabinet.

To perform Cross-Hatch Adhesion Testing (Grid Adhesion), a cutting guide or a special cross-hatch cutter with multiple preset blades is utilized to make parallel incisions with proper spacing on a testing area of a coating layer. Tape is then applied to the testing area of the coating and subsequently pulled off. The testing area is then inspected and rated. A standard method for the application and performance of this test is given as ASTM D3359 B.

To perform X-Hatch Adhesion Testing, two cuts are made into the coating layer using a sharp razor blade, scalpel, knife or other cutting device with a 30-45 degree angle between legs and down to the substrate which intersects to form an "X" on a testing area of a coating layer. A steel or other hard metal straightedge is used to ensure straight cuts. Tape is then applied to the testing area of the coating and subsequently pulled off. The testing area is then inspected and rated. A standard method for the application and performance of this test is given as ASTM D6677.

Adhesion can be rated on a sliding scale, which ranges from 0 (no adhesion, i.e., total failure) to 10 (complete adhesion, i.e., total success). The adhesion results are given in Table 6 below.

TABLE 6

| | Example 9.1: Silver Coating Compositions | | | | Example 9.2: Bright Red Coating Compositions | | | Example 9.3: Metallic Red Coating Compositions | | |
|---|---|---|---|---|---|---|---|---|---|---|
| | Dry Adhesion-Day 3 | | | | Dry Adhesion-Day 3 | | | Dry Adhesion-Day 3 | | |
| Sample | C5 | C1 | E1 | E2 | C6 | E9 | E10 | C9 | E15 | E16 |
| Grid | 5 | 4 | 7 | 8 | 3 | 7 | 9 | 6 | 9 | 9 |
| X Hatch | 10 | 9 | 10 | 10 | 10 | 10 | 10 | 6 | 10 | 10 |
| | Dry Adhesion-Day 5 | | | | Dry Adhesion-Day 5 | | | Dry Adhesion-Day 5 | | |
| Sample | C5 | C1 | E1 | E2 | C6 | E9 | E10 | C9 | E15 | E16 |
| Grid | 7 | 4 | 8 | 8 | 5 | 7 | 7 | 6 | 9 | 9 |
| X Hatch | 10 | 10 | 10 | 9 | 10 | 9 | 10 | 10 | 10 | 10 |
| | Dry Adhesion-Day 7 | | | | Dry Adhesion-Day 7 | | | Dry Adhesion-Day 7 | | |
| Sample | C5 | C1 | E1 | E2 | C6 | E9 | E10 | C9 | E15 | E16 |
| Grid | 2 | 3 | 7 | 8 | 4 | 7 | 7 | 4 | 9 | 8 |
| X Hatch | 10 | 10 | 10 | 10 | 10 | 9 | 10 | 10 | 10 | 10 |
| | Wet Adhesion-Immediate | | | | Wet Adhesion-Immediate | | | Wet Adhesion-Immediate | | |
| Sample | C5 | C1 | E1 | E2 | C6 | E9 | E10 | C9 | E15 | E16 |
| Grid | 7 | 2 | 8 | 8 | 5 | 3 | 3 | 8 | 8 | 8 |
| X Hatch | 10 | 10 | 9 | 10 | 10 | 10 | 10 | 10 | 10 | 10 |
| | Wet Adhesion-4 hours | | | | Wet Adhesion-4 hours | | | Wet Adhesion-4 hours | | |
| Sample | C5 | C1 | E1 | E2 | C6 | E9 | E10 | C9 | E15 | E16 |
| Grid | 5 | 2 | 8 | 8 | 4 | 3 | 6 | 8 | 8 | 8 |
| X Hatch | 8 | 8 | 10 | 10 | 10 | 10 | 10 | 10 | 10 | 10 |
| | Recovery-24 hours | | | | Recovery-24 hours | | | Recovery-24 hours | | |
| Sample | C5 | C1 | E1 | E2 | C6 | E9 | E10 | C9 | E15 | E16 |
| Grid | 7 | 2 | 8 | 9 | 1 | 3 | 3 | 4 | 8 | 8 |
| X Hatch | 9 | 8 | 9 | 10 | 10 | 10 | 10 | 10 | 9 | 10 |

The results of the adhesion testing of the coating layers of Example 9 clearly show that the exemplary coating compositions (Samples E1, E2, E9, E10, E15, and E16) form coating layers having improved adhesion as compared to coating layers of the comparative coating compositions (Samples C1, C5, C6, and C9) in all types of adhesion testing, including grid adhesion, x-hatch adhesion, dry adhesion, wet adhesion, and the 24 hours recovery adhesion. The results also demonstrate that the exemplary coating compositions can be utilized to form coating layers having improved adhesion for a wide range color families with different classes of pigment chemistries.

Example 10

Example 10 also describes the coating properties that can be achieved by utilizing both the first polymers (acid-functional) and the second polymers (amine-functional) in exemplary coating compositions. Example 10 particularly focuses on the second polymers having secondary amine-functional groups. The results show the improvement in adhesion performance of coating layers formed from the exemplary coating compositions as compared coating layers formed from comparative coating compositions. The improvement on adhesion performance is demonstrated in Silver.

Example 10.1: Silver Coating Compositions with Aluminum Flakes

Sample Coating Compositions are Generally Described as Follows:

C2 is a comparative coating composition including the polymer having a secondary amine-functional group of Example 1 (the second polymer); C5 is another comparative coating composition including the polymer having an acid-functional group of Example 6 (the first polymer); E3 is an exemplary coating composition including both the polymer of Example 1 (the second polymer) and the polymer of Example 6 (the first polymer); and E4 is another exemplary coating composition including both the polymer of Example 1 (the second polymer) and the polymer having an acid-functional group of Example 7 (the first polymer).

Preparation of the Coating Compositions:

Coating compositions were prepared using the same procedure described in Example 9 with the ingredients listed in Table 7 below. The coating compositions were sprayed and tested in the same manner as in Example 9.

TABLE 7

| | Example 10.1—Silver Coating Composition | | | |
|---|---|---|---|---|
| | C5 | C2 | E3 | E4 |
| Portion 1 | | | | |
| Acrylic Polyol Resin | 17.54 | 15.70 | 4.81 | |
| Example 1 Resin | | 13.35 | 13.37 | 12.69 |
| Example 6 Resin | 6.30 | | 10.89 | |
| Example 7 Resin | | | | 18.98 |
| Portion 2 | | | | |
| Wax Dispersion | 33.17 | 33.49 | 33.54 | 33.94 |
| Anti-Settling Dispersion | 3.97 | 3.97 | 3.97 | 1.59 |
| Portion 3 | | | | |
| Aluminum Paste | 7.25 | 7.25 | 7.25 | 7.25 |
| Portion 4 | | | | |
| CAB-20 Solution | 8.27 | 8.35 | 8.36 | 8.46 |
| CAB-1 Solution | 8.53 | 8.61 | 8.62 | 8.73 |
| Portion 5 | | | | |
| PGMEA | 2.52 | 2.52 | 2.52 | 2.52 |
| Butyl Acetate | 12.46 | 6.76 | 6.68 | 5.80 |

In Table 7, Anti-Settling Dispersion is a Bentone Dispersion; Aluminum Paste is aluminum paste in a mixture of aliphatic and aromatic solvents; CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; and PGMEA is Propylene Glycol Monomethyl Ether Acetate.

Example 10: Adhesion Testing of Coating Layers

Adhesion testing was performed on each of the coating layers of Example 10 in the same manner as in Example 9. Adhesion can be rated on a sliding scale, which ranges from 0 (no adhesion, i.e., total failure) to 10 (complete adhesion, i.e., total success). The adhesion results are given in Table 8 below.

TABLE 8

Example 10.1: Silver Coating Compositions Sample

|  | C5 | C2 | E3 | E4 |
|---|---|---|---|---|
| Dry Adhesion—Day 3 | | | | |
| Grid | 5 | 3 | 7 | 8 |
| X Hatch | 10 | 7 | 10 | 9 |
| Dry Adhesion—Day 5 | | | | |
| Grid | 7 | 2 | 7 | 8 |
| X Hatch | 10 | 10 | 10 | 10 |
| Dry Adhesion—Day 7 | | | | |
| Grid | 2 | 3 | 7 | 8 |
| X Hatch | 10 | 6 | 8 | 10 |
| Wet Adhesion—Immediate | | | | |
| Grid | 7 | 1 | 4 | 7 |
| X Hatch | 10 | 10 | 10 | 10 |
| Wet Adhesion—4 hours | | | | |
| Grid | 5 | 1 | 4 | 7 |
| X Hatch | 8 | 6 | 10 | 9 |
| Recovery—24 hours | | | | |
| Grid | 7 | 3 | 6 | 8 |
| X Hatch | 9 | 7 | 9 | 9 |

The results of the adhesion testing of the coating layers of Example 10 clearly show that the exemplary coating compositions (Samples E3 and E4) form coating layers having improved adhesion as compared to coating layers of the comparative coating compositions (Samples C2 and C5) in all types of adhesion testing, including grid adhesion, X-hatch adhesion, dry adhesion, wet adhesion, and the 24 hours recovery adhesion.

Example 11

Example 11 also describes the coating properties that can be achieved by utilizing both the first polymers (acid-functional) and the second polymers (amine-functional) in exemplary coating compositions. Example 11 particularly focuses on the second polymers having secondary amine-functional groups different than the secondary amine-functional groups of Example 10. The results show the improvement in adhesion performance of coating layers formed from the exemplary coating compositions as compared to coating layers formed from comparative coating compositions. The improvement on adhesion performance is demonstrated in 3 colors: Silver, Bright Red and Metallic Red.

Example 11.1: Silver Coating Compositions with Aluminum Flakes

Sample Coating Compositions are Generally Described as Follows:

C3 is a comparative coating composition including the polymer having a secondary amine-functional group of Example 2 (the second polymer); C5 is another comparative coating composition including the polymer having an acid-functional group of Example 6 (the first polymer); E5 is an exemplary coating composition including both the polymer of Example 2 (the second polymer) and the polymer of Example 6 (the first polymer); and E6 is another exemplary coating composition including both the polymer of Example 2 (the second polymer) and the polymer having an acid-functional group of Example 7 (the first polymer).

Preparation of the Coating Compositions:

Coating compositions were prepared using the same procedure described in Example 9 with the ingredients listed in Table 9 below. The coating compositions were sprayed and tested in the same manner as in Example 9.

TABLE 9

Example 11.1—Silver Coating Compositions

|  | C5 | C3 | E5 | E6 |
|---|---|---|---|---|
| Portion 1 | | | | |
| Acrylic Polyol Resin | 17.54 | 15.70 | 4.81 | |
| Example 2 Resin | | 13.35 | 13.37 | 12.69 |
| Example 6 Resin | 6.30 | | 10.89 | |
| Example 7 Resin | | | | 18.98 |
| Portion 2 | | | | |
| Wax Dispersion | 33.17 | 33.49 | 33.54 | 33.94 |
| Anti-Settling Dispersion | 3.97 | 3.97 | 3.97 | 1.59 |
| Portion 3 | | | | |
| Aluminum Paste | 7.25 | 7.25 | 7.25 | 7.25 |
| Portion 4 | | | | |
| CAB-20 Solution | 8.27 | 8.35 | 8.36 | 8.46 |
| CAB-1 Solution | 8.53 | 8.61 | 8.62 | 8.73 |
| Portion 5 | | | | |
| PGMEA | 2.52 | 2.52 | 2.52 | 2.52 |
| Butyl Acetate | 12.46 | 6.76 | 6.68 | 5.80 |

In Table 9, Anti-Settling Dispersion is a Bentone Dispersion; Aluminum Paste is aluminum paste in a mixture of aliphatic and aromatic solvents; CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; and PGMEA is Propylene Glycol Monomethyl Ether Acetate.

Example 11.2: Bright Red Coating Compositions

Sample Coating Compositions are Generally Described as Follows:

C7 is a comparative coating composition including the polymer having a secondary amine-functional group of Example 2 (the second polymer); E11 is an exemplary coating composition including both the polymer of Example 2 (the second polymer) and the polymer of Example 6 (the first polymer); and E12 is another exemplary coating composition including both the polymer of Example 2 (the second polymer) and the polymer having an acid-functional group of Example 7 (the first polymer).

Preparation of the Coating Compositions:

Coating compositions were prepared using the same procedure described in Example 9 with the ingredients listed in Table 10 below. The coating compositions were sprayed and tested in the same manner as in Example 9.

TABLE 10

Example 11.2—Bright Red Coating Compositions

|  | C7 | E11 | E12 |
|---|---|---|---|
| Portion 1 | | | |
| Acrylic Polyol Resin | 10.03 | | |
| Example 2 Resin | 12.20 | 12.11 | 9.22 |
| Example 6 Resin | | 9.86 | |
| Example 7 Resin | | | 13.53 |
| Portion 2 | | | |
| Wax Dispersion | 27.67 | 27.47 | 27.57 |
| Portion 3 | | | |
| First Red Dispersion | 17.46 | 17.46 | 17.46 |
| Portion 4 | | | |
| CAB-20 Solution | 6.9 | 6.85 | 6.88 |
| CAB-1 Solution | 7.12 | 7.06 | 7.09 |
| Portion 5 | | | |
| PGMEA | 2.5 | 2.5 | 2.5 |
| Butyl Acetate | 16.13 | 16.69 | 15.8 |

In Table 10, First Red Dispersion is Commercial Power Tint: PT-165 (manufactured by Axalta Coating Systems, Philadelphia, Pa.); CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; and PGMEA is Propylene Glycol Monomethyl Ether Acetate.

Example 11.3: Metallic Red Coating Composition with Aluminum Flakes

Sample Coating Compositions are Generally Described as Follows:

C10 is a comparative coating composition including the polymer having a secondary amine-functional group of Example 2 (the second polymer); E17 is an exemplary coating composition including both the polymer of Example 2 (the second polymer) and the polymer of Example 6 (the first polymer); and E18 is another exemplary coating composition including both the polymer of Example 2 (the second polymer) and the polymer having an acid-functional group of Example 7 (the first polymer).

Preparation of the Coating Compositions:

Coating compositions were prepared using the same procedure described in Example 9 with the ingredients listed in Table 11 below. The coating compositions were sprayed and tested in the same manner as in Example 9.

TABLE 11

Example 11.3—Metallic Red Coating Compositions

|  | C10 | E17 | E18 |
|---|---|---|---|
| Portion 1 | | | |
| Acrylic Polyol Resin | 13.40 | 2.58 | |
| Example 2 Resin | 13.25 | 13.27 | 10.77 |
| Example 6 Resin | | 10.81 | |
| Example 7 Resin | | | 17.32 |
| Portion 2 | | | |
| Wax Dispersion | 33.25 | 33.28 | 33.53 |
| Anti-Settling Dispersion | 1.59 | 1.59 | 1.59 |
| Portion 3 | | | |
| Aluminum Paste | 6.52 | 6.52 | 6.52 |
| Second Red Dispersion | 4.73 | 4.73 | 4.73 |
| Portion 4 | | | |
| CAB-20 Solution | 8.29 | 8.3 | 8.36 |
| CAB-1 Solution | 8.55 | 8.56 | 8.62 |
| Portion 5 | | | |
| PGMEA | 2.50 | 2.50 | 2.50 |
| Butyl Acetate | 7.92 | 7.87 | 6.09 |

In Table 11, Anti-Settling Dispersion is a Bentone Dispersion; Aluminum Paste is aluminum paste in a mixture of aliphatic and aromatic solvents; Second Red Dispersion is Chromabase® 866J (manufactured by Axalta Coating Systems, Philadelphia Pa.); CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; and PGMEA is Propylene Glycol Monomethyl Ether Acetate.

Example 11: Adhesion Testing of Coating Layers

Adhesion testing was performed on each of the coating layers of Example 11 in the same manner as in Example 9. Adhesion can be rated on a sliding scale, which ranges from 0 (no adhesion, i.e., total failure) to 10 (complete adhesion, i.e., total success). The adhesion results are given in Table 12 below.

TABLE 12

| | Example 11.1: Silver Coating Compositions | | | | Example 11.2: Bright Red Coating Compositions | | | Example 11.3: Metallic Red Coating Compositions | | |
|---|---|---|---|---|---|---|---|---|---|---|
| | Dry Adhesion-Day 3 | | | | Dry Adhesion-Day 3 | | | Dry Adhesion-Day 3 | | |
| Sample | C5 | C3 | E5 | E6 | C7 | E11 | E12 | C10 | E17 | E18 |
| Grid | 5 | 3 | 7 | 8 | 8 | 8 | 8 | 7 | 10 | 9 |
| X Hatch | 10 | 10 | 8 | 10 | 10 | 10 | 10 | 10 | 10 | 10 |
| | Dry Adhesion-Day 5 | | | | Dry Adhesion-Day 5 | | | Dry Adhesion-Day 5 | | |
| Sample | C5 | C3 | E5 | E6 | C7 | E11 | E12 | C10 | E17 | E18 |
| Grid | 7 | 5 | 7 | 8 | 8 | 7 | 8 | 6 | 9 | 9 |
| X Hatch | 10 | 10 | 10 | 10 | 10 | 10 | 10 | 10 | 9 | 10 |
| | Dry Adhesion-Day 7 | | | | Dry Adhesion-Day 7 | | | Dry Adhesion-Day 7 | | |
| Sample | C5 | C3 | E5 | E6 | C7 | E11 | E12 | C10 | E17 | E18 |
| Grid | 2 | 2 | 7 | 7 | 7 | 7 | 8 | 7 | 9 | 8 |
| X Hatch | 10 | 10 | 10 | 10 | 10 | 10 | 10 | 10 | 10 | 10 |

TABLE 12-continued

| Sample | Wet Adhesion-Immediate | | | | Wet Adhesion-Immediate | | | Wet Adhesion-Immediate | | |
|---|---|---|---|---|---|---|---|---|---|---|
| | C5 | C3 | E5 | E6 | C7 | E11 | E12 | C10 | E17 | E18 |
| Grid | 7 | 2 | 4 | 7 | 4 | 7 | 3 | 6 | 8 | 8 |
| X Hatch | 10 | 4 | 9 | 10 | 10 | 10 | 10 | 10 | 10 | 10 |

| Sample | Wet Adhesion-4 hours | | | | Wet Adhesion-4 hours | | | Wet Adhesion-4 hours | | |
|---|---|---|---|---|---|---|---|---|---|---|
| | C5 | C3 | E5 | E6 | C7 | E11 | E12 | C10 | E17 | E18 |
| Grid | 5 | 2 | 7 | 8 | 4 | 7 | 4 | 7 | 5 | 9 |
| X Hatch | 8 | 10 | 10 | 10 | 10 | 10 | 10 | 10 | 10 | 10 |

| Sample | Recovery-24 hours | | | | Recovery-24 hours | | | Recovery-24 hours | | |
|---|---|---|---|---|---|---|---|---|---|---|
| | C5 | C3 | E5 | E6 | C7 | E11 | E12 | C10 | E17 | E18 |
| Grid | 7 | 2 | 7 | 8 | 3 | 6 | 7 | 4 | 8 | 8 |
| X Hatch | 9 | 7 | 9 | 10 | 10 | 8 | 9 | 10 | 10 | 10 |

The results of the adhesion testing of the coating layers of Example 11 clearly show that the exemplary coating compositions (Samples E5, E6, E11, E12, E17, and E18) form coating layers having improved adhesion as compared to coating layers of the comparative coating compositions (Samples C3, C5, C7, and C10) in all types of adhesion testing, including grid adhesion, x-hatch adhesion, dry adhesion, wet adhesion, and the 24 hours recovery adhesion. The results also demonstrate that the exemplary coating compositions can be utilized to form coating layers having improved adhesion for a wide range color families with different classes of pigment chemistries.

Example 12

Example 12 also describes the coating properties that can be achieved by utilizing both the first polymers (acid-functional) and the second polymers (amine-functional) in exemplary coating compositions. Example 12 particularly focuses on the second polymers having tertiary amine-functional groups. The results show the improvement in adhesion performance of coating layers formed from the exemplary coating compositions as compared to coating layers formed from comparative coating compositions. The improvement on adhesion performance is demonstrated in 3 colors: Silver, Bright Red and Metallic Red.

Example 12.1: Silver Coating Compositions with Aluminum Flakes

Sample Coating Compositions are Generally Described as Follows:

C4 is a comparative coating composition including the polymer having a tertiary amine-functional group of Example 3 (the second polymer); C5 is another comparative coating composition including the polymer having an acid-functional group of Example 6 (the first polymer); E7 is an exemplary coating composition including both the polymer of Example 3 (the second polymer) and the polymer of Example 6 (the first polymer); and E8 is another exemplary coating composition including both the polymer of Example 3 (the second polymer) and the polymer having an acid-functional group of Example 7 (the first polymer).

Preparation of the Coating Compositions:

Coating compositions were prepared using the same procedure described in Example 9 with the ingredients listed in Table 13 below. The coating compositions were sprayed and tested in the same manner as in Example 9.

TABLE 13

| | Example 12.1—Silver Coating Compositions | | | |
|---|---|---|---|---|
| | C5 | C4 | E7 | E8 |
| Portion 1 | | | | |
| Acrylic Polyol Resin | 17.54 | 17.51 | 6.68 | |
| Example 3 Resin | | 10.25 | 10.26 | 9.80 |
| Example 6 Resin | 6.30 | | 10.83 | |
| Example 7 Resin | | | | 21.09 |
| Portion 2 | | | | |
| Wax Dispersion | 33.17 | 33.31 | 33.35 | 33.91 |
| Anti-Settling Dispersion | 3.97 | 3.97 | 3.97 | 1.59 |
| Portion 3 | | | | |
| Aluminum Paste | 7.25 | 7.25 | 7.25 | 7.25 |
| Portion 4 | | | | |
| CAB-20 Solution | 8.27 | 8.31 | 8.32 | 8.46 |
| CAB-1 Solution | 8.53 | 8.57 | 8.58 | 8.72 |
| Portion 5 | | | | |
| PGMEA | 2.52 | 2.52 | 2.52 | 2.52 |
| Butyl Acetate | 12.46 | 8.32 | 8.25 | 6.68 |

In Table 13, Anti-Settling Dispersion is a Bentone Dispersion; Aluminum Paste is aluminum paste in a mixture of aliphatic and aromatic solvents; CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; and PGMEA is Propylene Glycol Monomethyl Ether Acetate.

Example 12.2: Bright Red Coating Compositions

Sample Coating Compositions are Generally Described as Follows:

C8 is a comparative coating composition including the polymer having a tertiary amine-functional group of Example 3 (the second polymer); E13 is an exemplary coating composition including both the polymer of Example 3 (the second polymer) and the polymer of Example 6 (the first polymer); and E14 is another exemplary coating composition including both the polymer of Example 3 (the second polymer) and the polymer having an acid-functional group of Example 7 (the first polymer).

Preparation of the Coating Compositions:

Coating compositions were prepared using the same procedure described in Example 9 with the ingredients listed in Table 14 below. The coating compositions were sprayed and tested in the same manner as in Example 9.

TABLE 14

| | Example 12.2—Bright Red Coating Compositions | | |
|---|---|---|---|
| | C8 | E13 | E14 |
| Portion 1 | | | |
| Acrylic Polyol Resin | 10.92 | | |
| Example 3 Resin | 10.34 | 10.36 | 7.69 |
| Example 6 Resin | | 10.92 | |
| Example 7 Resin | | | 14.61 |

TABLE 14-continued

| | Example 12.2—Bright Red Coating Compositions | | |
|---|---|---|---|
| | C8 | E13 | E14 |
| Portion 2 | | | |
| Wax Dispersion | 27.39 | 27.44 | 27.57 |
| Portion 3 | | | |
| First Red Dispersion | 17.46 | 17.46 | 17.46 |
| Portion 4 | | | |
| CAB-20 solution | 6.83 | 6.84 | 6.88 |
| CAB-1 solution | 7.05 | 7.06 | 7.09 |
| Portion 5 | | | |
| PGMEA | 2.5 | 2.5 | 2.5 |
| Butyl Acetate | 17.51 | 17.44 | 16.25 |

In Table 14, First Red Dispersion is Commercial Power Tint: PT-165 (manufactured by Axalta Coating Systems, Philadelphia, Pa.); CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; and PGMEA is Propylene Glycol Monomethyl Ether Acetate.

Example 12.3: Metallic Red Coating Composition with Aluminum Flakes

Sample Coating Compositions are Generally Described as Follows:

C11 is a comparative coating composition including the polymer having a tertiary amine-functional group of Example 3 (the second polymer); E19 is an exemplary coating composition including both the polymer of Example 3 (the second polymer) and the polymer of Example 6 (the first polymer); and E20 is another exemplary coating composition including both the polymer of Example 3 (the second polymer) and the polymer having an acid-functional group of Example 7 (the first polymer).

Preparation of the Coating Compositions:

Coating compositions were prepared using the same procedure described in Example 9 with the ingredients listed in Table 15 below. The coating compositions were sprayed and tested in the same manner as in Example 9.

TABLE 15

| | Example 12.3—Metallic Red Coating Compositions | | |
|---|---|---|---|
| | C11 | E19 | E20 |
| Portion 1 | | | |
| Acrylic Polyol Resin | 15.27 | 4.47 | |
| Example 3 Resin | 10.22 | 10.23 | 8.95 |
| Example 6 Resin | | 10.79 | |
| Example 7 Resin | | | 18.62 |
| Portion 2 | | | |
| Wax Dispersion | 33.21 | 33.25 | 33.54 |
| Anti-Settling Dispersion | 1.59 | 1.59 | 1.59 |
| Portion 3 | | | |
| Aluminum Paste | 6.52 | 6.52 | 6.52 |
| Second Red Dispersion | 4.73 | 4.73 | 4.73 |
| Portion 4 | | | |
| CAB-20 Solution | 8.28 | 8.29 | 8.36 |
| CAB-1 Solution | 8.54 | 8.55 | 8.63 |
| Portion 5 | | | |
| PGMEA | 2.50 | 2.50 | 2.50 |
| Butyl Acetate | 9.15 | 9.08 | 6.58 |

In Table 15, Anti-Settling Dispersion is a Bentone Dispersion; Aluminum Paste is aluminum paste in a mixture of aliphatic and aromatic solvents; Second Red Dispersion is Chromabase® 866J (manufactured by Axalta Coating Systems, Philadelphia Pa.); CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; and PGMEA is Propylene Glycol Monomethyl Ether Acetate.

Example 12: Adhesion Testing of Coating Layers

Adhesion testing was performed on each of the coating layers of Example 12 in the same manner as in Example 9. Adhesion can be rated on a sliding scale, which ranges from 0 (no adhesion, i.e., total failure) to 10 (complete adhesion, i.e., total success). The adhesion results are given in Table 16 below.

TABLE 16

| | Example 12.1: Silver Coating Compositions | | | | Example 12.2: Bright Red Coating Compositions | | | Example 12.3: Metallic Red Coating Compositions | | |
|---|---|---|---|---|---|---|---|---|---|---|
| | Dry Adhesion-Day 3 | | | | Dry Adhesion-Day 3 | | | Dry Adhesion-Day 3 | | |
| Sample | C5 | C4 | E7 | E8 | C8 | E13 | E14 | C11 | E19 | E20 |
| Grid | 5 | 3 | 7 | 8 | 7 | 8 | 10 | 8 | 9 | 10 |
| X Hatch | 10 | 7 | 10 | 10 | 10 | 10 | 10 | 10 | 10 | 10 |
| | Dry Adhesion-Day 5 | | | | Dry Adhesion-Day 5 | | | Dry Adhesion-Day 5 | | |
| Sample | C5 | C4 | E7 | E8 | C8 | E13 | E14 | C11 | E19 | E20 |
| Grid | 7 | 5 | 7 | 8 | 7 | 7 | 9 | 6 | 9 | 9 |
| X Hatch | 10 | 10 | 10 | 10 | 10 | 8 | 10 | 10 | 10 | 10 |
| | Dry Adhesion-Day 7 | | | | Dry Adhesion-Day 7 | | | Dry Adhesion-Day 7 | | |
| Sample | C5 | C4 | E7 | E8 | C8 | E13 | E14 | C11 | E19 | E20 |
| Grid | 2 | 4 | 8 | 8 | 7 | 7 | 8 | 4 | 8 | 8 |
| X Hatch | 10 | 10 | 10 | 10 | 10 | 10 | 10 | 7 | 10 | 10 |
| | Wet Adhesion-Immediate | | | | Wet Adhesion-Immediate | | | Wet Adhesion-Immediate | | |
| Sample | C5 | C4 | E7 | E8 | C8 | E13 | E14 | C11 | E19 | E20 |
| Grid | 7 | 5 | 8 | 9 | 1 | 2 | 5 | 7 | 9 | 10 |
| X Hatch | 10 | 10 | 10 | 10 | 2 | 6 | 10 | 10 | 10 | 10 |

TABLE 16-continued

| Sample | Wet Adhesion- 4 hours | | | | Wet Adhesion- 4 hours | | | Wet Adhesion- 4 hours | | |
|---|---|---|---|---|---|---|---|---|---|---|
|  | C5 | C4 | E7 | E8 | C8 | E13 | E14 | C11 | E19 | E20 |
| Grid | 5 | 6 | 7 | 9 | 2 | 3 | 6 | 8 | 10 | 10 |
| X Hatch | 8 | 8 | 9 | 10 | 5 | 7 | 10 | 10 | 10 | 10 |

| Sample | Recovery- 24 hours | | | | Recovery- 24 hours | | | Recovery- 24 hours | | |
|---|---|---|---|---|---|---|---|---|---|---|
|  | C5 | C4 | E7 | E8 | C8 | E13 | E14 | C11 | E19 | E20 |
| Grid | 7 | 6 | 7 | 9 | 5 | 6 | 6 | 5 | 8 | 8 |
| X Hatch | 9 | 9 | 8 | 10 | 9 | 8 | 10 | 10 | 10 | 10 |

The results of the adhesion testing of the coating layers of Example 12 clearly show that the exemplary coating compositions (Samples E7, E8, E13, E14, E19, and E20) form coating layers having improved adhesion as compared to coating layers of the comparative coating compositions (Samples C4, C5, C8, and C11) in all types of adhesion testing, including grid adhesion, x-hatch adhesion, dry adhesion, wet adhesion, and the 24 hours recovery adhesion. The results also demonstrate that the exemplary coating compositions can be utilized to form coating layers having improved adhesion for a wide range color families with different classes of pigment chemistries.

Example 13

Example 13 also describes the coating properties that can be achieved by utilizing both the first polymers (acid-functional) and the second polymers (amine-functional), and a crosslinking agent in exemplary coating compositions. Example 13 particularly focuses utilizing polyisocyanates as the crosslinking agent. The results show the further improvement in adhesion performance of coating layers when utilizing the crosslinking agent. The improvement on adhesion performance is demonstrated in 2 colors: Silver and Bright Red.

Example 13.1: Silver Coating Compositions with Aluminum Flakes

Sample Coating Compositions are Generally Described as Follows:

E21 is an exemplary coating composition including both the polymer having a tertiary amine-functional group and a hydroxyl-functional group of Example 5 (the second polymer) and the polymer having an acid-functional group and a hydroxyl functional group of Example 7 (the first polymer); and E22 is another exemplary coating composition including both the polymer of Example 5 (the second polymer) and the polymer having an acid-functional group of Example 7 (the first polymer), and a polyisocyanate (crosslinking agent).

Preparation of the Coating Compositions:

In Table 17 below, the ingredients from Portion 1 and Portion 2 were added to a metal container and mixed well using an air mixer. Portion 3 was added to the container and mixed well for another 30 minutes. Portion 4 and portion 5 were then added in sequence and mixed well for 15 minutes. Activator 12305S™ (manufactured by Axalta Coating Systems, Philadelphia Pa.) was added to sample E22 after reduction (before spraying) at 1 oz per quart ratio. The coating compositions were sprayed and tested in the same manner as in Example 9.

TABLE 17

| | Example 13.1—Silver Coating Compositions | |
|---|---|---|
| | E21 | E22 |
| Portion 1 | | |
| Example 5 Resin | 8.9 | 8.9 |
| Example 7 Resin | 20.83 | 20.83 |
| Portion 2 | | |
| Wax Dispersion | 33.9 | 33.9 |
| Anti-Settling Dispersion | 1.58 | 1.58 |
| Portion 3 | | |
| Aluminum Paste | 7.14 | 7.14 |
| Portion 4 | | |
| CAB-20 Solution | 8.46 | 8.46 |
| CAB-1 Solution | 8.72 | 8.72 |
| Portion 5 | | |
| PGMEA | 2.52 | 2.52 |
| Butyl Acetate | 7.96 | 7.96 |
| Portion 6 | | |
| Activator 123055 ™ | | 1 oz/RTS quart |

In Table 17, Anti-Settling Dispersion is a Bentone Dispersion; Aluminum Paste is aluminum paste in a mixture of aliphatic and aromatic solvents; CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; PGMEA is Propylene Glycol Monomethyl Ether Acetate; and Activator 12305S™ is a polyisocyanate activator, commercially available from Axalta Coating Systems, Philadelphia, Pa.

Example 13.2: Bright Red Coating Compositions

Sample Coating Compositions are Generally Described as Follows:

E23 is an exemplary coating composition including both the polymer having a tertiary amine-functional group and a hydroxyl-functional group of Example 5 (the second polymer) and the polymer having an acid-functional group and a hydroxyl functional group of Example 7 (the first polymer); and E24 is another exemplary coating composition including both the polymer of Example 5 (the second polymer) and the polymer having an acid-functional group of Example 7 (the first polymer), and a polyisocyanate (crosslinking agent).

Preparation of the Coating Compositions:

In Table 18 below, the ingredients from Portion 1 and Portion 2 were added to a metal container and mixed well using an air mixer. Portion 3 was added to the container and mixed well for another 30 minutes. Portion 4 and portion 5 were then added in sequence and mixed well for 15 minutes. Activator 12305S™ was added to sample E24 after reduction (before spraying) at 1 oz per quart ratio. The coating compositions were sprayed and tested in the same manner as in Example 9.

TABLE 18

Example 13.2—Bright Red Coating Compositions

| | E23 | E24 |
|---|---|---|
| Portion 1 | | |
| Example 5 Resin | 6.97 | 6.97 |
| Example 7 Resin | 14.4 | 14.4 |
| Portion 2 | | |
| Wax Dispersion | 27.61 | 27.61 |
| Portion 3 | | |
| Red Dispersion | 17.45 | 17.45 |
| Portion 4 | | |
| CAB-20 Solution | 6.89 | 6.89 |
| CAB-1 Solution | 7.1 | 7.1 |
| Portion 5 | | |
| PGMEA | 2.52 | 2.52 |
| Butyl Acetate | 17.05 | 17.05 |
| Portion 6 | | |
| Activator 123055 ™ | | 1 oz/RTS quart |

In Table 18, Anti-Settling Dispersion is a Bentone Dispersion; First Red Dispersion is Commercial Power Tint: PT-165 (manufactured by Axalta Coating Systems, Philadelphia, Pa.); CAB-20 Solution is 15% by weight of CAB-381-20 (from Eastman Chemical Co., Kingsport, Tenn.) in a 7:3 ratio by weight of butyl acetate and methyl ethyl ketone; CAB-1 Solution is 15% by weight of CAB-531-1 (from Eastman Chemical Co., Kingsport, Tenn.) in a 7:3 ratio by weight of butyl acetate and methyl ethyl ketone; PGMEA is Propylene Glycol Monomethyl Ether Acetate; and Activator 12305S™ is a polyisocyanate activator, commercially available from Axalta Coating Systems, Philadelphia, Pa.

Example 13: Adhesion Testing of Coating Layers

Adhesion testing was performed on each of the coating layers of Example 13 in the same manner as in Example 9. Adhesion can be rated on a sliding scale, which ranges from 0 (no adhesion, i.e., total failure) to 10 (complete adhesion, i.e., total success). The adhesion results are given in Table 19 below.

TABLE 19

| | Example 13.1: Silver Coating Compositions | | Example 13.2: Bright Red Coating Compositions | |
|---|---|---|---|---|
| Sample | E21 | E22 | E23 | E24 |
| Dry Adhesion—Day 7 | | | | |
| Grid | 10 | 10 | 10 | 10 |
| X Hatch | 10 | 10 | 9 | 10 |
| Wet Adhesion—Immediate | | | | |
| Grid | 8 | 10 | 8 | 10 |
| X Hatch | 10 | 10 | 10 | 10 |
| Wet Adhesion—4 hour | | | | |
| Grid | 10 | 10 | 10 | 10 |
| X Hatch | 10 | 10 | 10 | 10 |
| Recovery—24 hours | | | | |
| Grid | 9 | 10 | 10 | 9 |
| X Hatch | 10 | 9 | 10 | 9 |

The results of the adhesion testing of the coating layers of Example 13 clearly show that the exemplary coating compositions (Samples E21, E22, E23, and E24) form coating layers having improved adhesion in all types of adhesion testing, including grid adhesion, x-hatch adhesion, dry adhesion, wet adhesion, and the 24 hours recovery adhesion. Further crosslinking of the first polymer and the second polymer with polyisocyanates demonstrate comparable and possibly improved grid and X hatch adhesion in the wet adhesion testing versus the coating compositions that were not further crosslinked with polyisocyanates. The results also demonstrate that the exemplary coating compositions can be utilized to form coating layers having improved adhesion for a wide range color families with different classes of pigment chemistries.

Example 14

Preparation of Sty/BA/MMA/EHA/HEMA/MAA Polymer, 20/20/20/15/10/15% by Weight

Example 14 describes the preparation of another polymer from a reaction mixture including an acid-functional monomer in an amount of 15 wt. % based on total weight of the reaction mixture. As described above, in embodiments, use of the acid-functional monomer in an amount greater than 12 wt. % may results in gelling of the coating composition. The resin solution was prepared using the procedure similar as described in Example 6 with the monomers and their weight ratios as listed above in butyl acetate solvent.

The resulting polymer solution was an extremely viscous clear polymer solution having a solid content of about 52.92% and a Gardner-Holtz viscosity of Z7. The polymer had a 38,017 Mw and a 11,549 Mn based on gel permeation chromatography using either polymethylmethacrylate or polystyrene as standard.

Example 15

Testing of Polymer Blends

In Table 20 below, the ingredients are combined according to the molar ratios of the acid-functional groups of the first polymer and the amine-functional groups of the second polymer. The resulting solutions are clear pale yellow polymer solutions. The viscosities of the polymer solutions are then measured on a Brookfield viscometer at 20 rpm using spindle #3.

TABLE 20

| | S1 | S2 | S3 | E25 | E26 | E27 | E28 | E29 |
|---|---|---|---|---|---|---|---|---|
| First Polymer from Example 14 (15 wt. % MAA) | 147.5 | — | — | 9.7 | — | 32.3 | 78.0 | — |
| First Polymer from Example 7 (1.4 wt. % MAA) | — | 149.5 | — | — | 64.2 | — | — | 138.1 |

TABLE 20-continued

|  | S1 | S2 | S3 | E25 | E26 | E27 | E28 | E29 |
|---|---|---|---|---|---|---|---|---|
| Second Polymer from Example 5 (7 wt. % DMAEA) | — | — | 189.0 | 176.6 | 107.8 | 147.6 | 88.9 | 14.5 |
| Butyl acetate | 177.5 | 175.5 | 136.0 | 138.7 | 153.0 | 145.1 | 158.0 | 172.4 |
| Total | 325.0 | 325.0 | 325.0 | 325.0 | 325.0 | 325.0 | 325.0 | 325.0 |
| Solids % | 25 | 25 | 25 | 25 | 25 | 25 | 25 | 25 |
| Molar Ratio of Functional Groups | na | na | na | 1/4 | 1/4 | 1/1 | 4/1 | 4/1 |
| Viscosity (cps) | 158 | 21 | 116 | 218 | 66 | 855 | 2440 | 33 |

The exemplary polymer solutions E25, E27, and E28 including the first polymer formed from 15 wt. % MAA and the second polymer exhibit increased viscosities as compared to the viscosities of the standard polymer solutions S1, S2, and S3 which only include either the first polymer or the second polymer. In contrast, the exemplary polymer solutions E26 and E29, which include less than 12 wt. % MAA, exhibit viscosities similar to the viscosities of the standard polymer solutions S1, S2, and S3. The results of the viscosity testing clearly show that interactions between the first polymers and the second polymers of the exemplary polymer solutions E26 and E29 are minimized prior to application and curing of the coating compositions as evidenced by the similar viscosities of the exemplary polymer solutions E26 and E29 and the standard polymer solutions S1, S2, and S3. It is believed that first polymers formed from MAA in an amount of no greater than 12 wt. % exhibit minimized interactions with the second polymer when in solution (e.g., prior to application of the coating composition). Such interactions will amplify on drying to give the enhanced film properties.

In contrast, the exemplary polymer solutions E25, E27, and E28 suffer from an increase in viscosities of the solutions as compared to the viscosities of the standard polymer solutions S1, S2, and S3 which is evidence of an increase in interactions between the first polymer and the second polymer prior to application and curing of the coating compositions due to the higher amount of MAA utilized to form the first polymer. The higher viscosities of these polymer solutions may have a negative impact on the spray application of the coating compositions including these polymer solutions in addition to the paint properties and thus limiting the coating composition latitude.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A solvent-borne coating composition for coating a substrate, comprising:
   a first polymer comprising a first polymer-bound moiety having an acid-functional group, or a derivative thereof;
   a second polymer comprising a second polymer-bound moiety having an amine-functional group; and
   an organic solvent;
   wherein the first polymer is substantially free of amine-functional groups and the second polymer is substantially free of acid-functional groups, or derivatives thereof;
   wherein the amine-functional group is a tertiary amine-functional group; and
   wherein the acid-functional groups and the amine-functional groups are substantially reactive to each other at least after application of the coating composition to the substrate.

2. The coating composition of claim 1, wherein the organic solvent is present in an amount of from 10 to 95 wt. % based on a total weight of the coating composition.

3. The coating composition of claim 1, wherein the coating composition is substantially free of water.

4. The coating composition of claim 1, wherein each of the first polymer and the second polymer, independently, has a weight average molecular weight in an amount of from about 2,000 to about 200,000.

5. The coating composition of claim 1, wherein the first polymer-bound moiety is polymerized from a first polymer monomer mixture comprising acid-functional monomers.

6. The coating composition of claim 5, wherein the acid-functional monomers are selected from the group of acrylic acid, methacrylic acid, crotonic acid, oleic acid, cinnamic acid, glutaconic acid, muconic acid, undecylenic acid, itaconic acid, fumaric acid, maleic acid, and combinations thereof.

7. The coating composition of claim 5, wherein the first polymer monomer mixture comprises the acid-functional monomers, or derivatives thereof, in an amount of from 0.1 to 12 wt. % based on a total weight of the first polymer monomer mixture.

8. The coating composition of claim 5, wherein the first polymer has a hydroxyl functional group, and wherein the first polymer monomer mixture further comprises hydroxyl-functional monomers.

9. The coating composition of claim 8, wherein the hydroxyl-functional monomers are selected from the group of 2-hydroxyethyl (meth)acrylate, hydroxypropyl (meth)acrylate, and combinations thereof.

10. The coating composition of claim 5, wherein the first polymer monomer mixture further comprises additional monomers selected from the group of styrene, methyl (meth)acrylate, butyl (meth)acrylate, ethylhexyl (meth)acrylate, isobornyl (meth)acrylate, and combinations thereof.

11. The coating composition of claim 1, wherein the second polymer is polymerized from a second polymer monomer mixture comprising amine-functional monomers, carboxyl-functional monomers, or a combination thereof.

12. The coating composition of claim 11, wherein the amine-functional monomers are selected from the group of t-butylaminoethyl methacrylate, N,N-dimethylaminoethyl acrylate, and combinations thereof.

13. The coating composition of claim 11, wherein the carboxyl-functional monomers are methacrylic acid.

14. The coating composition of claim 11, wherein the second polymer polymerized from the carboxyl-functional monomers is reacted with an imine compound to form amine-functional groups.

15. The coating composition of claim 11, wherein the second polymer monomer mixture comprises the amine-functional monomers, carboxyl-functional monomers, or the combination thereof in an amount of from 0.1 to 15 wt. % based on the total weight of the second polymer mixture.

16. The coating composition of claim 11, wherein the second polymer has hydroxyl functional groups, and wherein the second polymer monomer mixture further comprises hydroxyl-functional monomers.

17. The coating composition of claim 16, wherein the hydroxyl-functional monomers are selected from the group of 2-hydroxyethyl (meth)acrylate, hydroxypropyl (meth)acrylate, and combinations thereof.

18. The coating composition of claim 11, wherein the second polymer monomer mixture further comprises additional monomers selected from the group of styrene, methyl (meth)acrylate, butyl (meth)acrylate, ethylhexyl (meth)acrylate, isobornyl (meth)acrylate, and combinations thereof.

19. The coating composition of claim 1, wherein a coating layer formed from the coating composition has an improved adhesion to the substrate as compared to a coating layer formed from a coating composition not comprising both the acid-functional group and the amine-functional group.

20. The coating composition of claim 1 further comprising one or more non-functional polymers, crosslinking agents, pigments, additives, or combinations thereof.

21. The solvent borne coating composition of claim 1, wherein the organic solvent is present in an amount of from 40 to 95 wt. % based on a total weight of the coating composition.

* * * * *